US011932251B2

(12) United States Patent
Umeda et al.

(10) Patent No.: US 11,932,251 B2
(45) Date of Patent: Mar. 19, 2024

(54) VEHICLE CONTROL DEVICE, VEHICLE CONTROL METHOD, AND PROGRAM

(71) Applicant: HONDA MOTOR CO., LTD., Tokyo (JP)

(72) Inventors: Dan Umeda, Wako (JP); Yugo Ueda, Wako (JP); Yuki Motegi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 617 days.

(21) Appl. No.: 16/978,213

(22) PCT Filed: Mar. 9, 2018

(86) PCT No.: PCT/JP2018/009213
§ 371 (c)(1),
(2) Date: Sep. 4, 2020

(87) PCT Pub. No.: WO2019/171576
PCT Pub. Date: Sep. 12, 2019

(65) Prior Publication Data
US 2021/0046936 A1    Feb. 18, 2021

(51) Int. Cl.
*B60W 30/18* (2012.01)
*B60W 10/20* (2006.01)
(Continued)

(52) U.S. Cl.
CPC ...... *B60W 30/18163* (2013.01); *B60W 10/20* (2013.01); *B60W 30/0956* (2013.01);
(Continued)

(58) Field of Classification Search
CPC ........... B60W 10/20; B60W 30/18163; B60W 30/0956; B60W 30/16; B60W 40/02; B60W 50/0097; B60W 2555/60; G06V 20/58
See application file for complete search history.

(56) References Cited

U.S. PATENT DOCUMENTS

| 2009/0182505 | A1 | 7/2009 | Ikeda |
| 2016/0318518 | A1 | 11/2016 | Suzuki et al. |

(Continued)

FOREIGN PATENT DOCUMENTS

| CN | 104648402 | 5/2015 |
| CN | 105292103 | 2/2016 |

(Continued)

OTHER PUBLICATIONS

International Search Report and Written Opinion for International Application No. PCT/JP2018/009213 dated Jun. 12, 2018, 8 pages.
(Continued)

*Primary Examiner* — Lail A Kleinman
(74) *Attorney, Agent, or Firm* — Amin, Turocy & Watson, LLP

(57) ABSTRACT

A vehicle control device includes a recognizer configured to recognize an object around a host vehicle, a driving controller configured to control a speed and steering of the host vehicle and cause the host vehicle to overtake a moving body recognized as the object by the recognizer in a predetermined case, the moving body being a moving body present at a side of a road on which the host vehicle is present, and a predictor configured to predict that the host vehicle will be overtaken by the overtaken moving body at a future point in time when the moving body has been recognized by the recognizer, and the driving controller is configured to not cause the host vehicle to overtake the moving body when the predictor predicts that the host vehicle will be overtaken by the overtaken moving body at a future point in time.

13 Claims, 13 Drawing Sheets

(51) Int. Cl.
  *B60W 30/095* (2012.01)
  *B60W 30/14* (2006.01)
  *B60W 40/02* (2006.01)
  *B60W 50/00* (2006.01)

(52) U.S. Cl.
  CPC .......... *B60W 30/143* (2013.01); *B60W 40/02* (2013.01); *B60W 50/0097* (2013.01); *B60W 2555/60* (2020.02)

(56) References Cited

U.S. PATENT DOCUMENTS

| | | | | |
|---|---|---|---|---|
| 2017/0098132 | A1* | 4/2017 | Yokota | G06T 7/194 |
| 2017/0240176 | A1 | 8/2017 | Aoki et al. | |
| 2017/0300767 | A1* | 10/2017 | Zou | H04N 23/90 |
| 2017/0329340 | A1* | 11/2017 | Ulbrich | B60K 31/0008 |
| 2018/0032082 | A1* | 2/2018 | Shalev-Shwartz | G01C 21/3602 |
| 2019/0377354 | A1* | 12/2019 | Shalev-Shwartz | G08G 1/16 |
| 2021/0034884 | A1* | 2/2021 | Tsurumi | G06V 10/774 |

FOREIGN PATENT DOCUMENTS

| | | |
|---|---|---|
| JP | 2009-166691 | 7/2009 |
| JP | 2009-248892 | 10/2009 |
| JP | 2011-170762 | 9/2011 |
| JP | 2014-043156 | 3/2014 |
| JP | 2015-014948 | 1/2015 |
| JP | 2016-203942 | 12/2016 |
| JP | 2017-149254 | 8/2017 |

OTHER PUBLICATIONS

Chinese Office Action for Chinese Patent Application No. 201880090832.3 dated Nov. 23, 2022.

* cited by examiner

VEHICLE CONTROL DEVICE, VEHICLE CONTROL METHOD, AND PROGRAM

TECHNICAL FIELD

The present invention relates to a vehicle control device, a vehicle control method, and a program.

BACKGROUND ART

In recent years, research has been performed on automatic control of driving of a vehicle (hereinafter referred to as automated driving). Meanwhile, a technique of performing collision avoidance control for a high-speed bicycle at an early stage by predicting a traveling direction of the bicycle on which a rider is riding is known (for example, see Patent Document 1).

PRIOR ART DOCUMENTS

Patent Documents

[Patent Document 1]
Japanese Unexamined Patent Application, First Publication No. 2015-014948

SUMMARY OF INVENTION

Problems to be Solved by the Invention

However, in the related art, there is a case in which a host vehicle overtakes a two-wheeled vehicle such as a bicycle while avoiding the two-wheeled vehicle, stops in front of a signal immediately after overtaking, and is overtaken by the overtaken two-wheeled vehicle. In such a case, an occupant may not feel comfortable in automated driving.

The present invention has been made in view of the above circumstances, and an object of the present invention is to provide a vehicle control device, a vehicle control method, and a program capable of performing automated driving in which an occupant feels more comfortable.

Solution to Problem (1): A vehicle control device including: a recognizer configured to recognize an object around a host vehicle; a driving controller configured to control a speed and steering of the host vehicle and cause the host vehicle to overtake a moving body recognized as the object by the recognizer in a predetermined case, the moving body being a moving body present at a side of a road on which the host vehicle is present; and a predictor configured to predict that the host vehicle will be overtaken by the overtaken moving body at a future point in time when the moving body has been recognized by the recognizer, wherein the driving controller is configured to not cause the host vehicle to overtake the moving body when the predictor predicts that the host vehicle will be overtaken by the overtaken moving body at a future point in time.

(2): The vehicle control device according to (1), wherein the predictor is configured to predict that the host vehicle will stop at the future point in time when the host vehicle will arrive at a future position after a predetermined distance from the current position, and predict that the host vehicle will be overtaken by the overtaken moving body when the predictor predicts that the host vehicle will stop at the future point in time.

(3): The vehicle control device according to (2), wherein the predictor is further configured to predict that the host vehicle will start before the moving body overtakes the host vehicle when the predictor predicts that the host vehicle will stop at the future point in time, and predict that the host vehicle will not be overtaken by the overtaken moving body at the future point in time when the predictor predicts that the host vehicle will start before the moving body overtakes the host vehicle.

(4): The vehicle control device according to any one of (1) to (3), wherein the driving controller is configured to cause the host vehicle to overtake the moving body when the predictor predicts that the host vehicle will not be overtaken by the overtaken moving body at the future point in time.

(5): The vehicle control device according to any one of (1) to (4), wherein the driving controller also is configured to not cause the host vehicle to overtake the moving body when a color of lights of a traffic signal in front of the host vehicle is a first color indicating vehicle passage prohibition.

(6): The vehicle control device according to (5), wherein the predictor is further configured to predict that the color of the lights of the traffic signal will change from the first color to a second color indicating vehicle passage permission within a predetermined period from the current point in time to the future point in time when the color of the lights of the traffic signal in front of the host vehicle is the first color at the current point in time, and the driving controller is configured to cause the host vehicle to overtake the moving body when the predictor predicts that the color of the lights of the traffic signal will change from the first color to the second color within the predetermined period.

(7): The vehicle control device according to any one of (1) to (6), wherein the predictor is configured to predict that the host vehicle will be overtaken by the overtaken moving body at the future point in time when there is a space beside the host vehicle in which the host vehicle will be overtaken by the overtaken moving body at the future point in time.

(8): The vehicle control device according to any one of (1) to (7), wherein the driving controller is configured to not cause the host vehicle to overtake the moving body from the next time when the host vehicle is overtaken by the overtaken moving body after the host vehicle is caused to overtake the moving body.

(9): The vehicle control device according to any one of (1) to (8), wherein the driving controller is configured to not cause the host vehicle to overtake the moving body from the next time when the host vehicle being overtaken by the moving body after the driving controller causes the host vehicle to overtake the moving body is repeated a predetermined number of times or more.

(10): The vehicle control device according to any one of (1) to (9), wherein the driving controller is configured to cause the host vehicle to travel while at least keeping an inter-vehicle distance between the host vehicle and the moving body constant instead of causing the host vehicle to overtake the moving body when the predictor predicts that the host vehicle will be overtaken by the overtaken moving body at the future point in time.

(11): The vehicle control device according to any one of (1) to (10), wherein the recognizer further recognizes a two-wheeled vehicle-only lane from the road, and the driving controller is configured to cause the host vehicle to overtake the moving body when the recognizer recognizes the two-wheeled vehicle-only lane.

(12): A vehicle control method including: recognizing, by a vehicle-mounted computer, an object around a host vehicle; controlling, by the vehicle-mounted computer, a speed and steering of the host vehicle and causing the host vehicle to overtake a moving body recognized as an object in a predetermined case, the moving body being a moving body present at a side of a road on which the host vehicle is present; predicting, by the vehicle-mounted computer, that the host vehicle will be overtaken by the overtaken moving body at a future point in time when the moving body is recognized; and not causing, by the vehicle-mounted computer, the host vehicle to overtake the moving body when it is predicted that the host vehicle will be overtaken by the overtaken moving body at a future point in time.

(13): A computer-readable non-transitory storage medium storing a program for causing a vehicle-mounted computer to execute the processes of: recognizing an object around a host vehicle; controlling a speed and steering of the host vehicle and causing the host vehicle to overtake a moving body recognized as an object in a predetermined case, the moving body being a moving body present at a side of a road on which the host vehicle is present; predicting that the host vehicle will be overtaken by the overtaken moving body at a future point in time when the moving body is recognized; and not causing the host vehicle to overtake the moving body when it is predicted that the host vehicle will be overtaken by the overtaken moving body at a future point in time.

Advantageous Effects of Invention

According to (1) to (13), it is possible to perform automated driving in which an occupant feels more comfortable.

DESCRIPTION OF EMBODIMENTS

Hereinafter, embodiments of a vehicle control device, a vehicle control method, and a program of the present invention will be described with reference to the drawings. Hereinafter, a case in which left-hand driving is applied will be described, but right and left may be reversed when right-hand driving is applied.

First Embodiment

[Overall Configuration]

Figure 1:
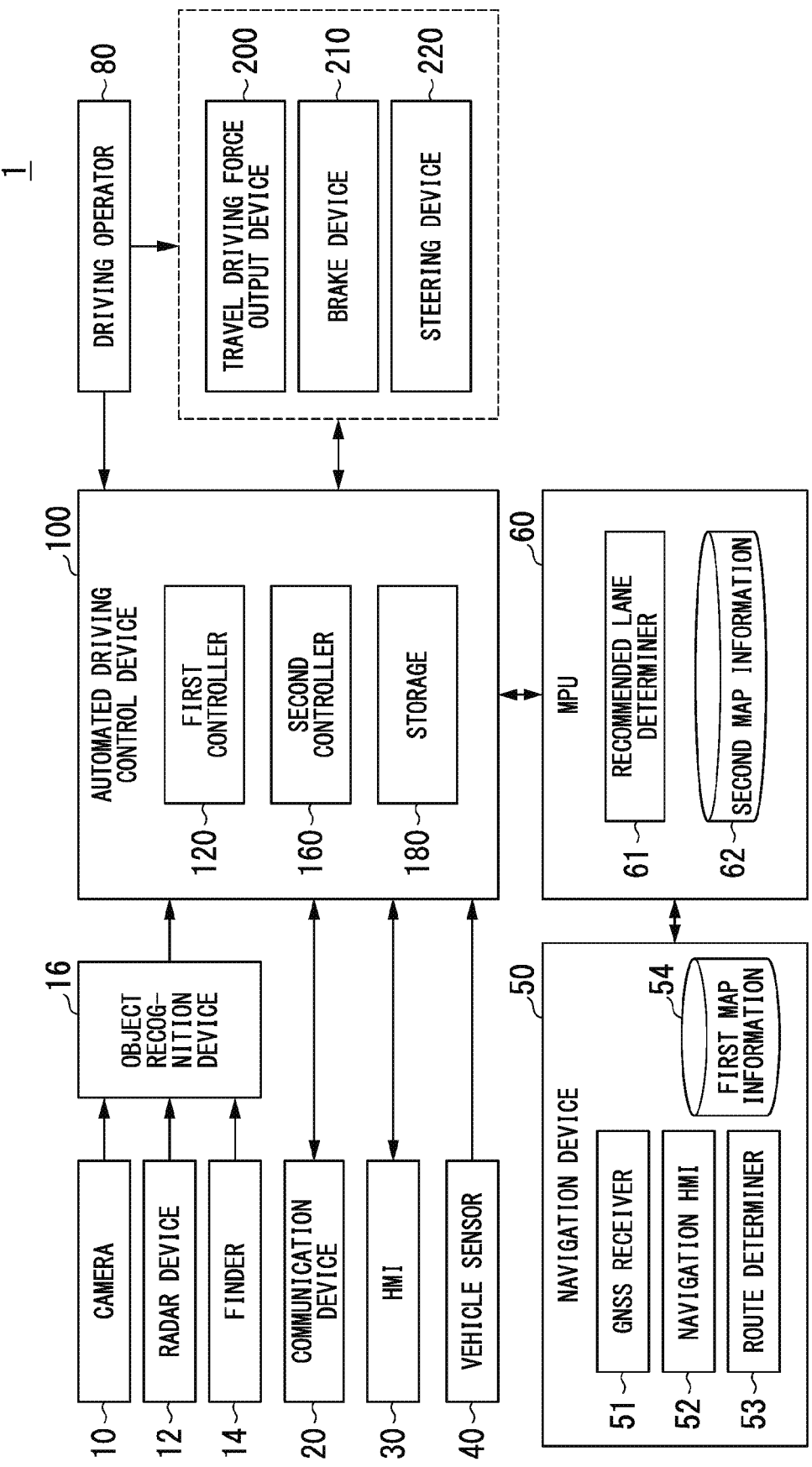
FIG. 1 is a configuration diagram of a vehicle system 1 using a vehicle control device according to a first embodiment.

FIG. 1 is a configuration diagram of a vehicle system 1 using a vehicle control device according to a first embodiment. A vehicle in which the vehicle system 1 is mounted (hereinafter referred to as a host vehicle M) is, for example, a vehicle such as a two-wheeled vehicle, a three-wheeled vehicle, or a four-wheeled vehicle. A driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration illustrated in FIG. 1 is merely an example, and a part of the configuration may be omitted or other constituents may be added thereto.

The camera 10 is, for example, a digital camera using a solid-state imaging device such as a charge coupled device (CCD) or a complementary metal oxide semiconductor (CMOS). The camera 10 is attached to any place on the host vehicle M. In the case of forward imaging, the camera 10 is attached to, for example, an upper portion of a front windshield, a rear surface of a rearview mirror, or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by an object to detect at least a position (a distance and orientation) of the object. The radar device 12 is attached to any place on the host vehicle M. The radar device 12 may detect a position and a speed of the object using a frequency modulated continuous wave (FM-CW) scheme.

The finder 14 is a light detection and ranging (LIDAR) finder. The finder 14 radiates light to the surroundings of the host vehicle M and measures scattered light. The finder 14 detects a distance to a target on the basis of a time from light emission to light reception. The radiated light is, for example, pulsed laser light. The finder 14 is attached to any place on the host vehicle M.

The object recognition device 16 performs a sensor fusion process on detection results of some or all of the camera 10, the radar device 12, and the finder 14 to recognize a position, type, speed, and the like of the object. The object recognition device 16 outputs recognition results to the automated driving control device 100. The object recognition device 16 may output the detection results of the camera 10, the radar device 12, and the finder 14 as they are to the automated driving control device 100. The object recognition device 16 may be omitted from the vehicle system 1.

The communication device 20, for example, communicates with another vehicle present around the host vehicle M using a cellular network, a Wi-Fi network, Bluetooth (registered trademark), dedicated short range communication (DSRC), or the like or communicates with various server devices via a wireless base station.

The HMI 30 presents various types of information to the occupant of the host vehicle M and receives an input operation from the occupant. The HMI 30 includes various display devices, speakers, buzzers, a touch panel, switches, keys, and the like.

The vehicle sensor 40 includes, for example, a vehicle speed sensor that detects a speed of the host vehicle M, an acceleration sensor that detects an acceleration, a yaw rate sensor that detects an angular speed around a vertical axis, and an orientation sensor that detects a direction of the host vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory.

The GNSS receiver 51 specifies a position of the host vehicle M on the basis of a signal received from GNSS satellites. The position of the host vehicle M may be specified or corrected by an inertial navigation system (INS) using an output of the vehicle sensor 40.

The navigation HMI 52 includes a display device, a speaker, a touch panel, keys, and the like. The navigation HMI 52 may be partly or wholly shared with the HMI 30 described above.

The route determiner 53, for example, determines a route (hereinafter, an on-map route) from the position of the host vehicle M specified by the GNSS receiver 51 (or any input position) to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The on-map route is output to the MPU 60.

The navigation device 50 may perform route guidance using the navigation HMI 52 on the basis of the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block by referring to the second map information 62. The recommended lane determiner 61 determines in which lane from the left the host vehicle M travels. The recommended lane determiner 61 determines the recommended lane so that the host vehicle M can travel on a reasonable route for travel to a branch destination when there is a branch place in the on-map route.

The second map information 62 is map information with higher accuracy than the first map information 54. The second map information 62 includes, for example, information on a center of the lane or information on a boundary of the lane. Further, the second map information 62 may include road information, traffic regulation information, address information (an address and postal code), facility information, telephone number information, and the like. The second map information 62 may be updated at any time by the communication device 20 communicating with another device.

The driving operator 80 includes, for example, an accelerator pedal, a brake pedal, a shift lever, a steering wheel, a variant steering wheel, a joystick, and other operators. A sensor that detects the amount of operation or the presence or absence of the operation is attached to the driving operator 80, and a detection result thereof is output to the automated driving control device 100 or some or all of the travel driving force output device 200, the brake device 210, and the steering device 220.

The automated driving control device 100 includes, for example, a first controller 120, a second controller 160, and a storage 180. The first controller 120 and the second controller 160 are realized, for example, by a hardware processor such as a central processing unit (CPU) executing a program (software). Further, some or all of these components may be realized by hardware (circuit portion; including circuitry) such as a large scale integration (LSI), an application specific integrated circuit (ASIC), a field-programmable gate array (FPGA) or a graphics processing unit (GPU), or may be realized by software and hardware in cooperation. The program may be stored in the storage 180 of the automated driving control device 100 in advance or may be stored in a detachable storage medium such as a DVD or a CD-ROM and installed in the storage 180 by the storage medium being mounted in a drive device.

The storage 180 is realized by, for example, an HDD, a flash memory, an electrically erasable programmable read-only memory (EEPROM), a read only memory (ROM), or a random access memory (RAM). The storage 180 stores, for example, a program that is read and executed by a processor.

Figure 2:
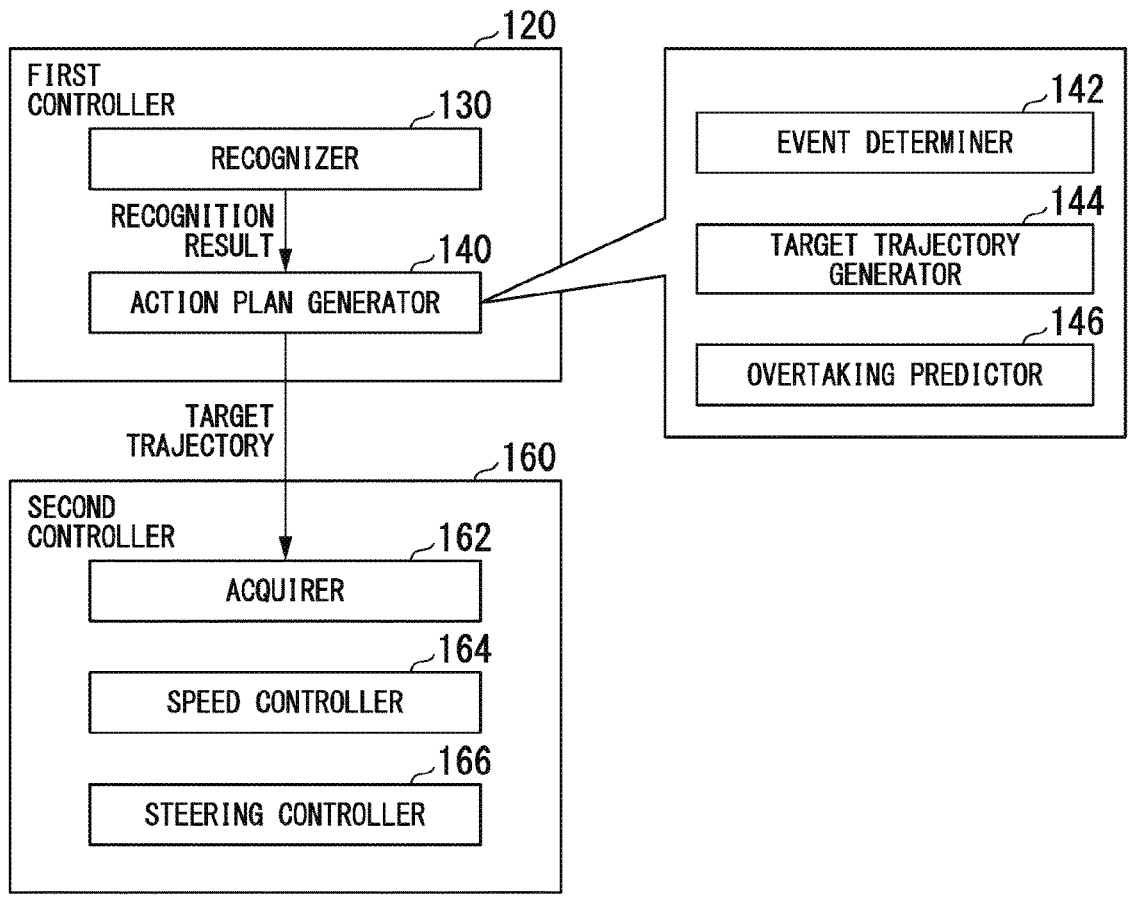
FIG. 2 is a functional configuration diagram of a first controller 120 and a second controller 160.

FIG. 2 is a functional configuration diagram of the first controller 120 and the second controller 160. The first controller 120 includes, for example, a recognizer 130 and an action plan generator 140. The first controller 120 realizes, for example, a function using artificial intelligence (AI) and a function using a previously given model in parallel. For example, a function of "recognizing an intersection" may be realized by recognition of an intersection using deep learning or the like and recognition based on previously given conditions (there is a signal which can be subjected to pattern matching, a road sign, or the like) being executed in parallel and scored for comprehensive evaluation. Accordingly, the reliability of automated driving is ensured.

The recognizer 130 recognizes an object present around the host vehicle M on the basis of information input from the camera 10, the radar device 12, and the finder 14 via the object recognition device 16. Examples of the objects recognized by the recognizer 130 include bicycles, motorcycles, four-wheeled vehicles, pedestrians, road signs, road markings, demarcation lines, utility poles, guard rails, and fallen objects. Further, the recognizer 130 recognizes a position of the object, or a status such as a speed and acceleration of the object. The position of the object, for example, is recognized as a position (that is, a relative position with respect to the host vehicle M) at coordinates with a representative point (a centroid, a drive shaft center, or the like) of the host vehicle M as an origin, and is used for control. The position of the object may be represented by a representative point such as a centroid or a corner of the object or may be represented by a represented area. The "status" of the object may include an acceleration or jerk of the object, or an "action status" (for example, whether or not the object is changing lanes or is about to change lanes).

Further, the recognizer 130, for example, may recognize a host lane in which the host vehicle M is traveling. For example, the recognizer 130 compares a pattern of road demarcation lines (for example, an arrangement of solid lines and broken lines) obtained from the second map information 62 with a pattern of road demarcation lines around the host vehicle M recognized from an image captured by the camera 10 to recognize the host lane. The recognizer 130 may recognize not only the road demarcation lines but also a traveling road boundary (a road boundary) including road demarcation lines, a road shoulder, a curb, a median strip, a guard rail, or the like to recognize the host lane. In this recognition, the position of the host vehicle M acquired from the navigation device 50 or a processing result of an INS may be additionally considered. Further, the recognizer 130 recognizes a temporary stop line, an obstacle, a red signal, a toll gate, and other road events.

The recognizer 130 recognizes a position or posture of the host vehicle M with respect to the host lane when recognizing the host lane. The recognizer 130 may recognize, for example, a deviation of a reference point of the host vehicle M from a center of the lane and an angle formed between a traveling direction of the host vehicle M and a line connecting along the center of the lane as the relative position and posture of the host vehicle M with respect to the host lane. Instead, the recognizer 130 may recognize, for example, a position of the reference point of the host vehicle M with respect to any one of side end portions (the road demarcation line or the road boundary) of the host lane as the relative position of the host vehicle M with respect to the traveling lane.

The action plan generator 140 includes, for example, an event determiner 142, a target trajectory generator 144, and an overtaking predictor 146. The event determiner 142 determines an automated driving event in a route in which the recommended lane has been determined. The event is information defining a traveling mode of the host vehicle M.

Examples of the event include a constant-speed traveling event in which the host vehicle M is caused to travel in the same lane at a constant speed, a following traveling event in which the host vehicle M is caused to follow another vehicle (hereinafter referred to as a preceding vehicle) present within a predetermined distance (for example, within 100 m) in front of the host vehicle M and closest to the host vehicle M, a lane change event in which the host vehicle M is caused to perform lane change from the host lane to an adjacent lane, a branching event in which the host vehicle M is caused to branch to a lane on the destination side at a branch point of a road, a merging event in which the host vehicle M is caused to merge with a main lane at a merging point, and a takeover event for ending automated driving and performing switching to manual driving. "Following" may be, for example, a traveling mode in which an inter-vehicle distance (a relative distance) between the host vehicle M and the preceding vehicle is kept constant, or may be a traveling mode in which the host vehicle M is caused to travel at a center of the host lane, in addition to the relative distance between the host vehicle M and the preceding vehicle being kept constant. Further, examples of the event may include an overtaking event in which the host vehicle M is first caused to perform lane change to an adjacent lane, overtake a preceding vehicle in the adjacent lane, and then, perform lane change to an original lane again, or the host vehicle M is caused to approach a demarcation line that demarcates the host lane, overtake the preceding vehicle in the same lane and then, return to an original position (for example, a center of the lane), instead of causing the host vehicle M to perform lane change to an adjacent lane, and an avoidance event in which the host vehicle M is caused to perform at least one of braking and steering in order to avoid an obstacle present in front of the host vehicle M.

Further, the event determiner 142 may change an event already determined for a current section to another event or determine a new event for the current section according to a situation of surroundings recognized by the recognizer 130 when the host vehicle M is traveling.

For example, when the recognizer 130 recognizes that a two-wheeled vehicle such as a bicycle or a motorcycle is present in front of the host vehicle M (that is, the two-wheeled vehicle is a preceding vehicle), and the two-wheeled vehicle is present at the side of the road, the event determiner 142 changes an event determined for the current section to the overtaking event.

"The side of the road" is, for example, an area of a road including a road shoulder or a roadside belt of the road. The road shoulder or the roadside belt is a belt-shaped region between a road boundary (for example, a curb) and an outermost demarcation line (a demarcation line closest to the road boundary) among a plurality of demarcation lines formed on the road. Further, the "side of the road" may include a partial area of a lane closest to the road boundary (hereinafter, referred to as a first traveling lane) among one or more lanes demarcated by the demarcation lines.

Figure 3:
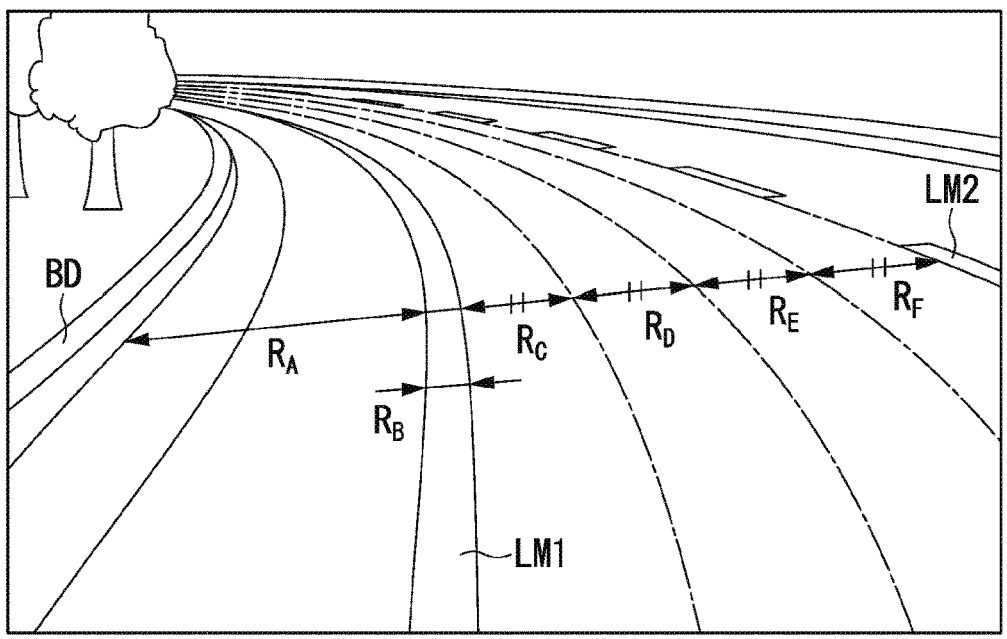
FIG. 3 is a diagram illustrating a side of a road.

FIG. 3 is a diagram illustrating the side of the road. In FIG. 3, BD represents a road boundary, LM1 represents an outermost demarcation line, and LM2 represents a demarcation line that divides the same lane (the first traveling lane) as the demarcation line LM1. For example, the side of the road may be a road region including only the roadside belt (the road shoulder) that is a belt-shaped region $R_A$ between the road boundary BD and the demarcation line LM1, or may be a road region including the region $R_A$ and a region $R_B$ in which the demarcation line LM1 has been formed. Further, the side of the road may be a road region including a region closest to the road boundary BD among separate regions obtained by dividing the first traveling lane demarcated by the demarcation lines LM1 and LM2 into equal parts in a vehicle width direction. In the illustrated example, the first traveling lane is divided into four equal parts including regions $R_C$ to $R_F$ in the vehicle width direction. In such a case, the side of the road may be a road region including the region $R_C$ closest to the road boundary BD. Further, the region treated as the side of the road is not limited to the region $R_C$ closest to the road boundary BD, and may be all regions on the road boundary BD side from at least a center of the first lane, such as the region $R_D$ second closest to the road boundary BD. Thus, the side of the road is treated as a road region including some or all of the roadside belt (road shoulder) $R_A$, the region $R_B$ in which the demarcation line LM1 is formed, and the regions $R_C$ and $R_D$ on the road boundary BD side from the center of the first traveling lane. In the following description, a two-wheeled vehicle present at a side of a road will be referred to as a "roadside vehicle m #".

The target trajectory generator 144 generates a future target trajectory in which the host vehicle M will travel in the recommended lane determined by the recommended lane determiner 61 in principle, and the host vehicle M is caused to travel automatically (regardless of a driver's operation) in a traveling mode defined by the events in order to cope with a situation of surroundings when the host vehicle M travels in the recommended lane. The target trajectory includes, for example, a position element that defines a future position of the host vehicle M, and a speed element that defines a future speed, acceleration, or the like of the host vehicle M.

For example, the target trajectory generator 144 determines a plurality of points (trajectory points) at which the host vehicle M is to arrive in order, as the position elements of the target trajectory. The trajectory point is a point at which the host vehicle M is to arrive for each predetermined traveling distance (for example, several [m]). The predetermined traveling distance may be calculated, for example, using a road distance when the host vehicle M travels along the route.

The target trajectory generator 144 determines a target speed or a target acceleration at every predetermined sampling time (for example, every several tenths of a second) as the speed elements of the target trajectory. Further, the trajectory points for each sampling time may be positions at which the host vehicle M will arrive at predetermined sampling times. In this case, the target speed or the target acceleration is determined using the sampling time and an interval between the trajectory points. The target trajectory generator 144 outputs information indicating the generated target trajectory to the second controller 160.

When the recognizer 130 recognizes the roadside vehicle m #, the overtaking predictor 146 predicts (determines) whether or not the host vehicle M will be overtaken by the overtaken roadside vehicle m # at a certain point in time in the future if the host vehicle M overtakes the roadside vehicle m # at the current point in time.

When the overtaking predictor 146 predicts that the host vehicle M will be overtaken by the roadside vehicle m # at a certain point in time in the future even when the host vehicle M overtakes the roadside vehicle m #, for example, the event determiner 142 changes an event determined for the current section to the following traveling event in which the roadside vehicle m # is a preceding vehicle instead of changing the event to the overtaking event. When the event determined for the current section is changed to the following traveling event instead of being changed to the overtaking event, the target trajectory generator 144 determines a target speed or the like so that an inter-vehicle distance between the host vehicle M and the roadside vehicle m # is constant, and generates a target trajectory including the target speed or the like as a speed element, as a target trajectory corresponding to the following traveling event. In this case, the target trajectory generator 144 may generate a target trajectory including a trajectory point located at the center of the host lane as a position element, as the target trajectory corresponding to the following traveling event.

Further, when the overtaking predictor 146 predicts that the host vehicle M will not be overtaken by the roadside vehicle m # at the certain point in time in the future even when the host vehicle M overtakes the roadside vehicle m #, for example, the event determiner 142 changes the event determined for the current section to the overtaking event as originally scheduled. When the event determined for the current section is changed to the overtaking event, the target trajectory generator 144 generates a target trajectory for causing the host vehicle M to perform lane change to an adjacent lane, or generates a target trajectory for causing the host vehicle M to move to one side of the host lane within the host lane.

The second controller 160 controls the travel driving force output device 200, the brake device 210, and the steering device 220 so that the host vehicle M passes along the target trajectory generated by the target trajectory generator 144 at scheduled times.

The second controller 160 includes, for example, an acquirer 162, a speed controller 164, and a steering controller 166. A unit including the event determiner 142, the target trajectory generator 144, and the second controller 160 is an example of a "driving controller".

The acquirer 162 acquires information on the target trajectory (trajectory points) generated by the target trajectory generator 144 and stores the information on the target trajectory in a memory of the storage 180.

The speed controller 164 controls one or both of the travel driving force output device 200 and the brake device 210 on the basis of the speed element (for example, the target speed or target acceleration) included in the target trajectory stored in the memory.

The steering controller 166 controls the steering device 220 according to a position element included in the target trajectory (for example, a curvature indicating a degree of bending of the target trajectory) stored in the memory.

Processes of the speed controller 164 and the steering controller 166 are realized by, for example, a combination of feedforward control and feedback control. For example, the steering controller 166 executes a combination of feedforward control according to a curvature of a road in front of the host vehicle M and feedback control based on a deviation from the target trajectory.

The travel driving force output device 200 outputs a travel driving force (torque) for traveling of the vehicle to the driving wheels. The travel driving force output device 200 includes, for example, a combination of an internal combustion engine, an electric motor, a transmission, and the like, and an electronic control unit (ECU) that controls these. The power ECU controls the above configuration according to information input from the second controller 160 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to information input from the second controller 160 or information input from the driving operator 80 so that a brake torque according to a braking operation is output to each wheel. The brake device 210 may include a mechanism that transfers the hydraulic pressure generated by the operation of the brake pedal included in the driving operator 80 to the cylinder via a master cylinder, as a backup. The brake device 210 is not limited to the configuration described above and may be an electronically controlled hydraulic brake device that controls the actuator according to information input from the second controller 160 and transfers the hydraulic pressure of the master cylinder to the cylinder.

The steering device 220 includes, for example, a steering ECU and an electric motor. The electric motor, for example, changes a direction of the steerable wheels by causing a force to act on a rack and pinion mechanism. The steering ECU drives the electric motor according to information input from the second controller 160 or information input from the driving operator 80 to change the direction of the steerable wheels.

[Processing Flow]

Figure 4:
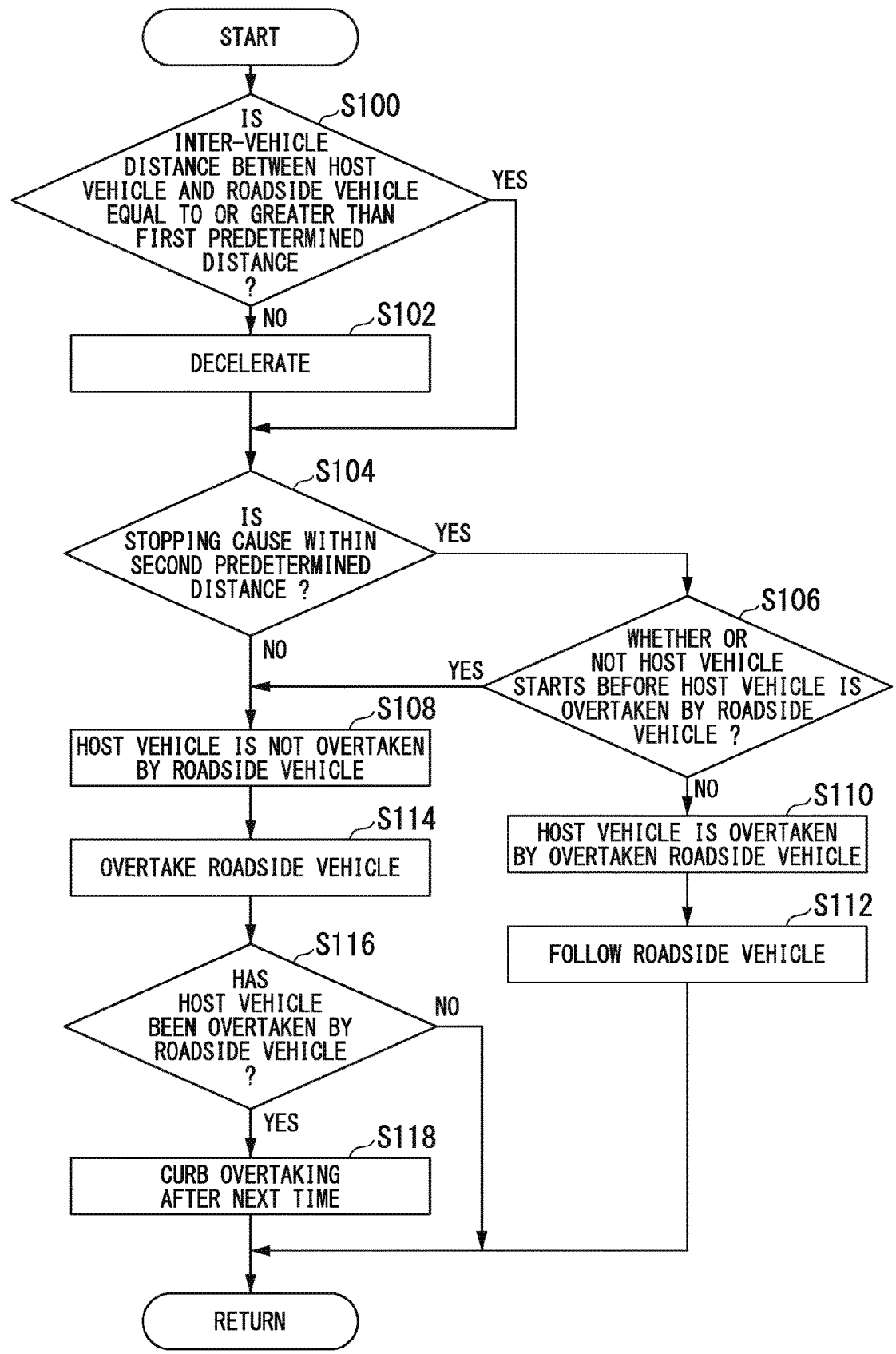
FIG. 4 is a flowchart showing an example of a flow of a series of processes in an automated driving control device 100 according to the first embodiment.

Hereinafter, a flow of a series of processes in the automated driving control device 100 according to the first embodiment will be described using a flowchart. FIG. 4 is a flowchart showing an example of the flow of the series of processes in the automated driving control device 100 according to the first embodiment. For example, a process of this flowchart is repeatedly performed in a predetermined cycle when the recognizer 130 recognizes the roadside vehicle m #.

First, the event determiner 142 determines whether or not an inter-vehicle distance $D_{X1}$ between the roadside vehicle m # recognized by the recognizer 130 and the host vehicle M is equal to or greater than the first predetermined distance $D_{XTH1}$ (step S100). The first predetermined distance $D_{XTH1}$ is set to be longer than an inter-vehicle distance secured by the host vehicle M when the preceding vehicle is a four-wheel vehicle, for example.

When the event determiner 142 determines that the inter-vehicle distance $D_{X1}$ between the roadside vehicle m # and the host vehicle M is smaller than the first predetermined distance $D_{XTH1}$, the event determiner 142 determines the current event to be a deceleration event. In response thereto, the target trajectory generator 144 determines the target speed or the like of the host vehicle M such that the inter-vehicle distance $D_{X1}$ becomes equal to or greater than the first predetermined distance $D_{XTH1}$, and generates the target trajectory including the target speed or the like as speed elements. The second controller 160 decelerates the host vehicle M until the inter-vehicle distance $D_{X1}$ becomes equal to or greater than the first predetermined distance $D_{XTH1}$ on the basis of the generated target trajectory (step S102).

On the other hand, when the automated driving control device 100 determines that the inter-vehicle distance $D_{X1}$ between the roadside vehicle m # and the host vehicle M is equal to or greater than the first predetermined distance $D_{XTH1}$, the automated driving control device 100 omits the process of S102 and proceeds to a process of S104.

Next, the overtaking predictor 146 determines whether or not a cause due to which the host vehicle M must stop (hereinafter, referred to as a stopping cause) is present in a section from the current position of the host vehicle M to the future scheduled arrival position after the second predetermined distance $D_{XTH2}$ (step S104). In other words, the overtaking predictor 146 determines whether or not a distance $D_{X2}$ from the current position of the host vehicle M to the stopping cause is equal to or smaller than the second predetermined distance $D_{XTH2}$. Examples of the stopping cause include stop lines, crosswalks, railroad crossings, traffic signals, intersections, and vehicles stopped due to congestion, signal waiting, and the like. Because the host vehicle M decelerates to a speed at which the host vehicle M can be considered to be stopped or traveling slowly, such as about 0 [km/h] or several [km/h] due to such a stopping cause, it is easy for a speed of the roadside vehicle m # to become higher than that of the host vehicle M. Thus, even when the host vehicle M overtakes the roadside vehicle m #, the host vehicle M is highly likely to be overtaken by the roadside vehicle m # around the stopping cause when there is a stopping cause in front of the host vehicle M.

The second predetermined distance $D_{XTH2}$, for example, may be determined to be a predetermined distance or may be dynamically determined by an absolute speed of the host vehicle M, an absolute speed of the roadside vehicle m #, a relative speed between the host vehicle M and the roadside vehicle m #, a relative distance between the host vehicle M and the roadside vehicle m #, time to collision (TTC) obtained by dividing the relative distance between the host vehicle M and the roadside vehicle m # by the relative speed between the host vehicle M and the roadside vehicle m #, or the like. For example, when the roadside vehicle m # is greatly slower than the host vehicle M and the relative speed between these vehicles is high, a traveling distance of the host vehicle M from the start of overtaking to the completion of overtaking is relatively short and thus, the second predetermined distance $D_{XTH2}$ may be short, whereas when the host vehicle M is slightly faster than the roadside vehicle m # and the relative speed between the vehicles is low, a traveling distance of the host vehicle M from the start of overtaking to the completion of overtaking is relatively long and thus, it is preferable for the second predetermined distance $D_{XTH2}$ to be long.

Further, the second predetermined distance $D_{XTH2}$ may be determined on the basis of the feelings of a person regarding whether the person is likely to feel uncomfortable when the host vehicle M is overtaken by the roadside vehicle m # within seconds or minutes after the host vehicle M overtakes the roadside vehicle m #. For example, the second predetermined distance $D_{XTH2}$ may be lengthened for the host vehicle M in which an occupant feeling uncomfortable when the host vehicle M is overtaken by the roadside vehicle m # even though a relatively long time has passed since the host vehicle M has overtaken the roadside vehicle m #, and the second predetermined distance $D_{XTH2}$ may be shortened for the host vehicle M on which an occupant not feeling uncomfortable when the host vehicle M is overtaken by the roadside vehicle m # if a relatively long time has passed since the host vehicle M has overtaken the roadside vehicle m #. In this case, the roadside vehicle m # overtaking the host vehicle M at a position beyond the second predetermined distance $D_{XTH2}$ may be regarded as a situation in which the occupant does not feel uncomfortable.

For example, the overtaking predictor 146 determines that there is a stopping cause when there is a traffic signal, a railroad crossing, an intersection, a stop line, a crosswalk, or the like in a section from the current position of the host vehicle M specified by the navigation device 50 to the future scheduled arrival position after the second predetermined distance $D_{XTH2}$ on a map indicated by the first map information 54 and the second map information 62. Further, for example, the overtaking predictor 146 may determine that there is a stopping cause when the recognizer 130 recognizes that there is a traffic signal, a railroad crossing, an intersection, a stop line, a crosswalk, or the like in the section from the current position of the host vehicle M to the future scheduled arrival position after the second predetermined distance $D_{XTH2}$ or the recognizer 130 recognizes that there is congestion involving a plurality of vehicles and a last vehicle of the plurality of vehicles is stopped.

When the overtaking predictor 146 determines that there is a stopping cause in the section from the current position to the future scheduled arrival position after the second predetermined distance $D_{XTH2}$, that is, when the overtaking predictor 146 determines that the distance $D_{X2}$ is equal to or smaller than the second predetermined distance $D_{XTH2}$, the overtaking predictor 146 further determines (predicts) whether or not the host vehicle M that has stopped in front of an object serving as the stopping cause will start before the host vehicle M is overtaken by the overtaken roadside vehicle m # (step S106).

For example, the overtaking predictor 146 may derive a future point in time when the roadside vehicle m # behind overtakes the host vehicle M on the basis of the absolute speed of the host vehicle M, the absolute speed of the roadside vehicle m #, the relative speed between the host vehicle M and the roadside vehicle m #, the relative distance between the host vehicle M and the roadside vehicle m #, the TTC for the host vehicle M and the roadside vehicle m #, and the like. When the overtaking predictor 146 predicts that a last vehicle in congestion recognized as a stopping cause by the recognizer 130 will start and the congestion in front of the host vehicle M will be resolved during a period from the current point in time to the derived future point in time, the overtaking predictor 146 determines that the host vehicle M will start before the host vehicle M will be overtaken by the roadside vehicle m #.

Further, when the overtaking predictor 146 predicts that the color of the lights of the traffic signal recognized as the stopping cause by the recognizer 130 will change from red (an example of first color) indicating prohibition of passage of a vehicle to blue (an example of second color) indicating permission of passage of the vehicle during a period from a current point in time that is a prediction time to the derived future point in time, the overtaking predictor 146 may determine that the host vehicle M will start before the host vehicle M will be overtaken by the roadside vehicle m #.

Further, when the recognizer 130 recognizes a switching timing of the color of the lights of the traffic signal, the overtaking predictor 146 may determine whether or not the host vehicle M will start before the host vehicle M is overtaken by the roadside vehicle m # on the basis of the switching timing of the color of the lights of the traffic signal. For example, the switching timing includes a timing of switching from red to blue and a timing of switching from blue to red.

For example, when the signal is recognized as a stopping cause immediately after the color of the lights of the traffic signal changes from blue to red, a stop period of the host vehicle M due to the stopping cause becomes longer as compared with a case in which the signal is recognized as the stopping cause after a while after the signal changes from blue to red, and the host vehicle M is easily overtaken by the overtaken roadside vehicle m #. Thus, the overtaking predictor 146 may determine that the host vehicle M will not start before the host vehicle M is overtaken by the roadside vehicle m # when an elapsed time after the color of the lights of the traffic signal is switched from blue to red is smaller than a threshold value, and determine that the host vehicle M will start before the host vehicle M will be overtaken by the roadside vehicle m # when the elapsed time after the color of the lights of the traffic signal is switched from blue to red is equal to or greater than the threshold value.

Further, for example, when the communication device 20 communicates with an external device that monitors a timing at which the color of the lights of the traffic signal is switched, and acquires information including the timing at which the color of the lights of the traffic signal is switched from the external device, the overtaking predictor 146 may determine whether or not the host vehicle M will start before the host vehicle M will be overtaken by the roadside vehicle m on the basis of the information acquired by the communication device 20.

Further, when the recognizer 130 recognizes a temporary stop line as the stopping cause, the overtaking predictor 146 may determine that the host vehicle M will start before the host vehicle M will be overtaken by the roadside vehicle m # because the stop period is shorter as compared with other stopping causes.

When the overtaking predictor 146 determines in the process of S104 that there are no stopping causes in the section from the current position to the future scheduled arrival position after the second predetermined distance $D_{XTH2}$, and determines in the process of S106 that the host vehicle M will start before the host vehicle M will be overtaken by the roadside vehicle m #, the overtaking predictor 146 predicts that the host vehicle M will not be overtaken by the overtaken roadside vehicle m # at a future point in time even when the host vehicle M has overtaken the roadside vehicle m # at the current point in time (step S108).

On the other hand, when the overtaking predictor 146 determines in the process of S106 that the host vehicle M does not start before the host vehicle M is overtaken by the roadside vehicle m #, the overtaking predictor 146 predicts that the host vehicle M will be overtaken by the overtaken roadside vehicle m # at a future point in time if the host vehicle M overtakes the roadside vehicle m # at a current point in time (step S110).

Then, when the overtaking predictor 146 predicts that the host vehicle M will be overtaken by the overtaken roadside vehicle m # at a future point in time in a case in which the host vehicle M overtakes the roadside vehicle m # at the current point in time, the event determiner 142 changes the event determined for the current section to the following traveling event because the roadside vehicle m # is recognized by the recognizer 130. Originally, the event determiner 142 changes the event determined for the current section to the overtaking event.

In response thereto, the target trajectory generator 144 generates a target trajectory corresponding to the following traveling event. In this case, the target trajectory generator 144 generates, as a target trajectory corresponding to the following traveling event, a target trajectory including, as a speed element, the target speed or the like determined so that the inter-vehicle distance $D_{X1}$ between the host vehicle and the roadside vehicle m # becomes equal to or greater than the first predetermined distance $D_{XTH1}$. The second controller 160 causes the host vehicle M to follow the roadside vehicle m # on the basis of the generated target trajectory (step S112).

Figure 5:
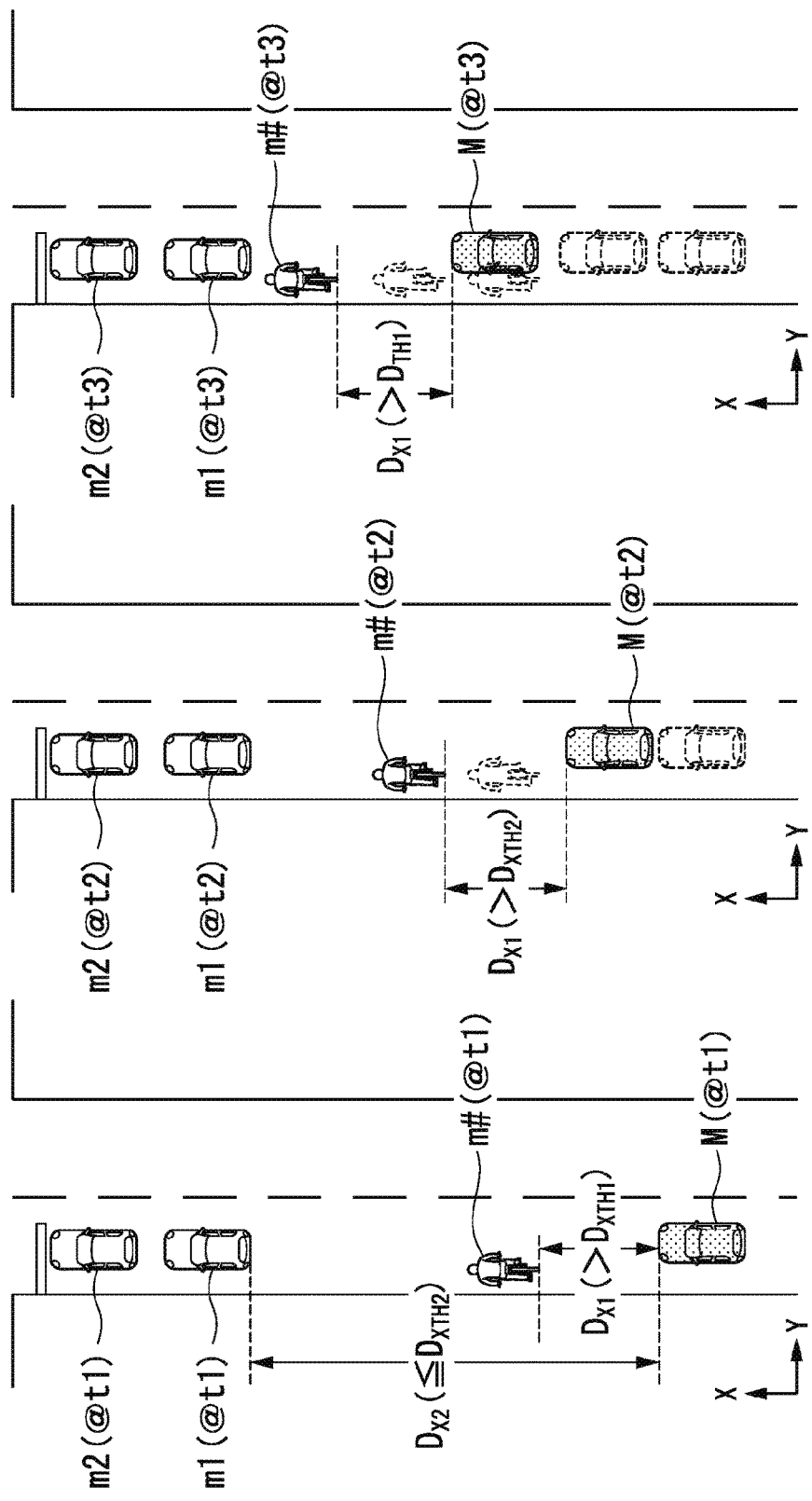
FIG. 5 is a diagram illustrating an example of a scene in which a host vehicle M is caused to overtake a roadside vehicle m #.

FIG. 5 is a diagram illustrating an example of a scene in which the host vehicle M is caused to follow the roadside vehicle m #. In FIG. 5, X represents the traveling direction of the vehicle, and Y represents the vehicle width direction. Further, (@t1) represents a state (position or the like) of each vehicle at time t1, (@t2) represents a state of each vehicle at time t2, and (@t3) represents a state of each vehicle at time t3.

For example, in a scene (A) at time t1, other vehicles m1 and m2 stopped due to signal waiting and a roadside vehicle m # are present in front of the host vehicle M, an inter-vehicle distance $D_{X1}$ between the host vehicle M and the roadside vehicle m # exceeds the first predetermined distance $D_{XTH1}$, and these vehicles are sufficiently separated from each other. In this case, the other vehicle m1 closest to the host vehicle M among a plurality of stopped other vehicles becomes a stopping cause. Further, the scene (A) shows that a distance $D_{x2}$ from a current position of the host vehicle M to the other vehicle m1 serving as the stopping cause is equal to or smaller than the second predetermined distance $D_{XTH2}$. Thus, in the scene (A), the overtaking predictor 146 predicts that the host vehicle M will be overtaken by the roadside vehicle m # at a future point in time when the host vehicle M arrives at the other vehicle m1 serving as the stopping cause. Thereby, the host vehicle M travels while following the roadside vehicle m # while keeping the inter-vehicle distance $D_{X1}$ between the host vehicle M and the roadside vehicle m # equal to or greater than the first predetermined distance $D_{XTH1}$, instead of overtaking the roadside vehicle m #, as shown in the scene (B) at time t2 from time t1 or the scene (C) at time t3 from time t2.

Referring back to FIG. 4, on the other hand, the event determiner 142 changes the event determined for the current section to the overtaking event when the overtaking predictor 146 predicts that the host vehicle M will not be overtaken by the roadside vehicle m # at a future point in time even when the host vehicle M overtakes the roadside vehicle m # at the current point in time.

In response thereto, the target trajectory generator 144 generates a target trajectory corresponding to the overtaking event. The second controller 160 causes the host vehicle M to overtake the roadside vehicle m # based on the generated target trajectory (step S114).

Figure 6:
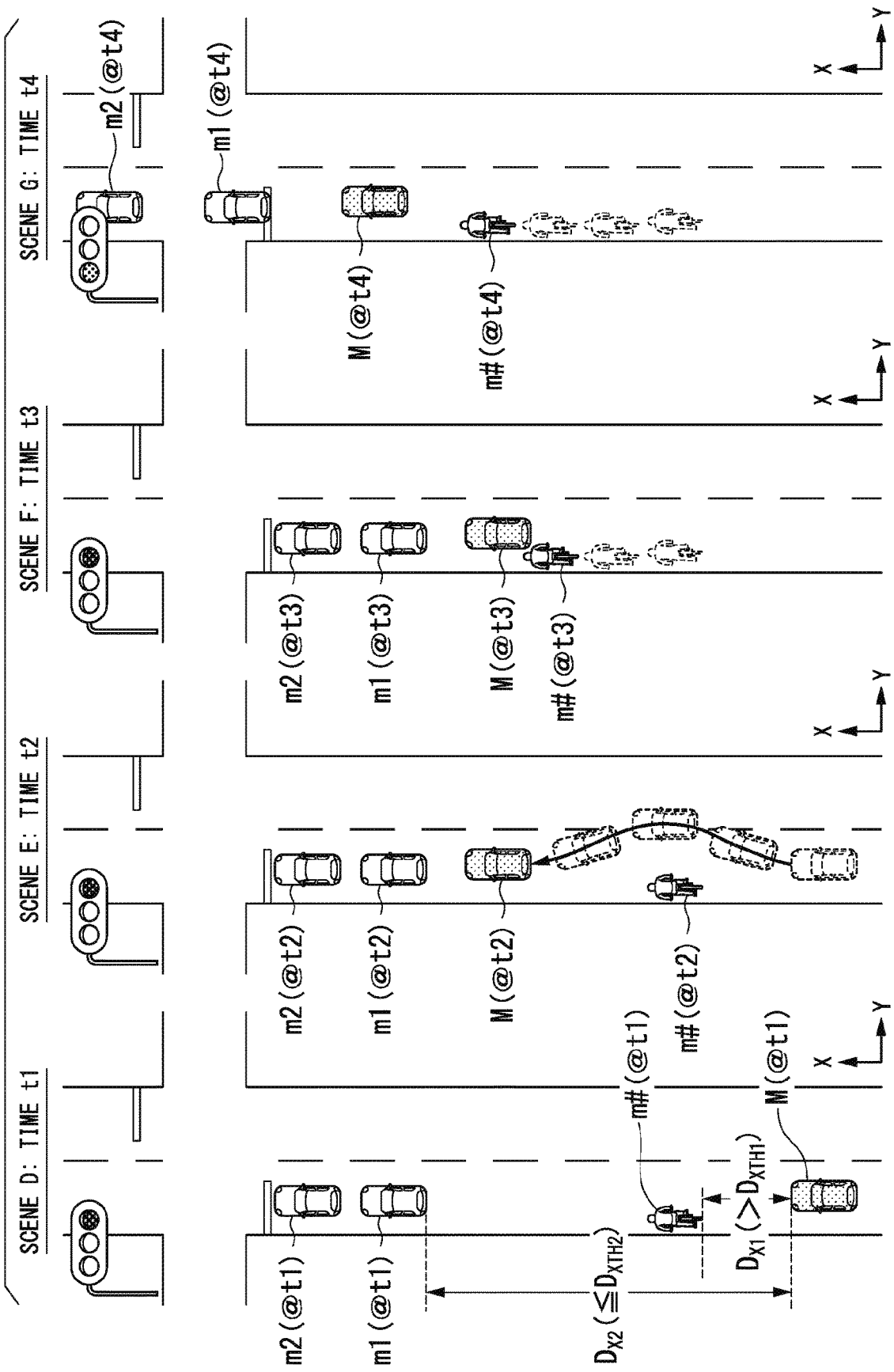
FIG. 6 is a diagram illustrating an example of a scene in which the host vehicle M is caused to overtake a roadside vehicle m #.

FIG. 6 is a diagram illustrating an example of a scene in which the host vehicle M overtakes the roadside vehicle m #. For example, in a scene (D) at time t1, there are other vehicles m1 and m2 stopped due to signal waiting and the roadside vehicle m # in front of the host vehicle M, as in the scene (A) in FIG. 5. The inter-vehicle distance $D_{X1}$ between the host vehicle M and the roadside vehicle m # exceeds the first predetermined distance $D_{XTH1}$ and these vehicles are sufficiently separated from each other. Further, in the scene (D), it is predicted that the distance $D_{X2}$ from the current position of the host vehicle M to the other vehicle m1 serving as a stopping cause is equal to or smaller than the second predetermined distance $D_{XTH2}$, but the host vehicle M will stop behind the other vehicle m1 and then color of lights of the traffic signal will change from red to blue before the roadside vehicle m # overtakes the host vehicle M. Accordingly, in the scene (D), the overtaking predictor 146 predicts that the host vehicle M will not be overtaken by the roadside vehicle m # at a future point in time when the host vehicle M arrives behind the other vehicle m1. In this case, the second controller 160 causes the host vehicle M to overtake the roadside vehicle m # in a scene (E) at time t2 after time t1.

For example, in a scene (F) at time t3 when the overtaking of the roadside vehicle m # has been completed, the host vehicle M arrives behind the other vehicle m1 and stops and thus, the roadside vehicle m # behind approaches the host vehicle M. In a scene (G) at time t4 after time t3, color of lights of the traffic signal switches from red to blue before the roadside vehicle m # behind overtakes the host vehicle M, as expected. In this case, the other vehicles m1 and m2 in front of the host vehicle M start and enter an intersection according to the color of the lights of the traffic signal, and the host vehicle M also starts. Thus, if there is sufficient time for the roadside vehicle m # to overtake the host vehicle M even when there is a stopping cause in front of the host vehicle M, the host vehicle M is caused to overtake the roadside vehicle m # in front of the host vehicle M.

Referring back to FIG. 4, after the process of S114, the event determiner 142 then determines whether or not the host vehicle M has been overtaken by the overtaken roadside vehicle m # on the basis of a recognition result of the recognizer 130 (step S116). For example, when the roadside vehicle m # recognized behind the host vehicle M due to overtaking is recognized in front of the host vehicle M again, the event determiner 142 determines that the host vehicle M has been overtaken by the overtaken roadside vehicle m #.

When the event determiner 142 determines that the host vehicle M has been overtaken by the overtaken roadside vehicle m #, the action plan generator 140 curbs the overtaking of the roadside vehicle m # after the next time (step S118).

Figure 7:
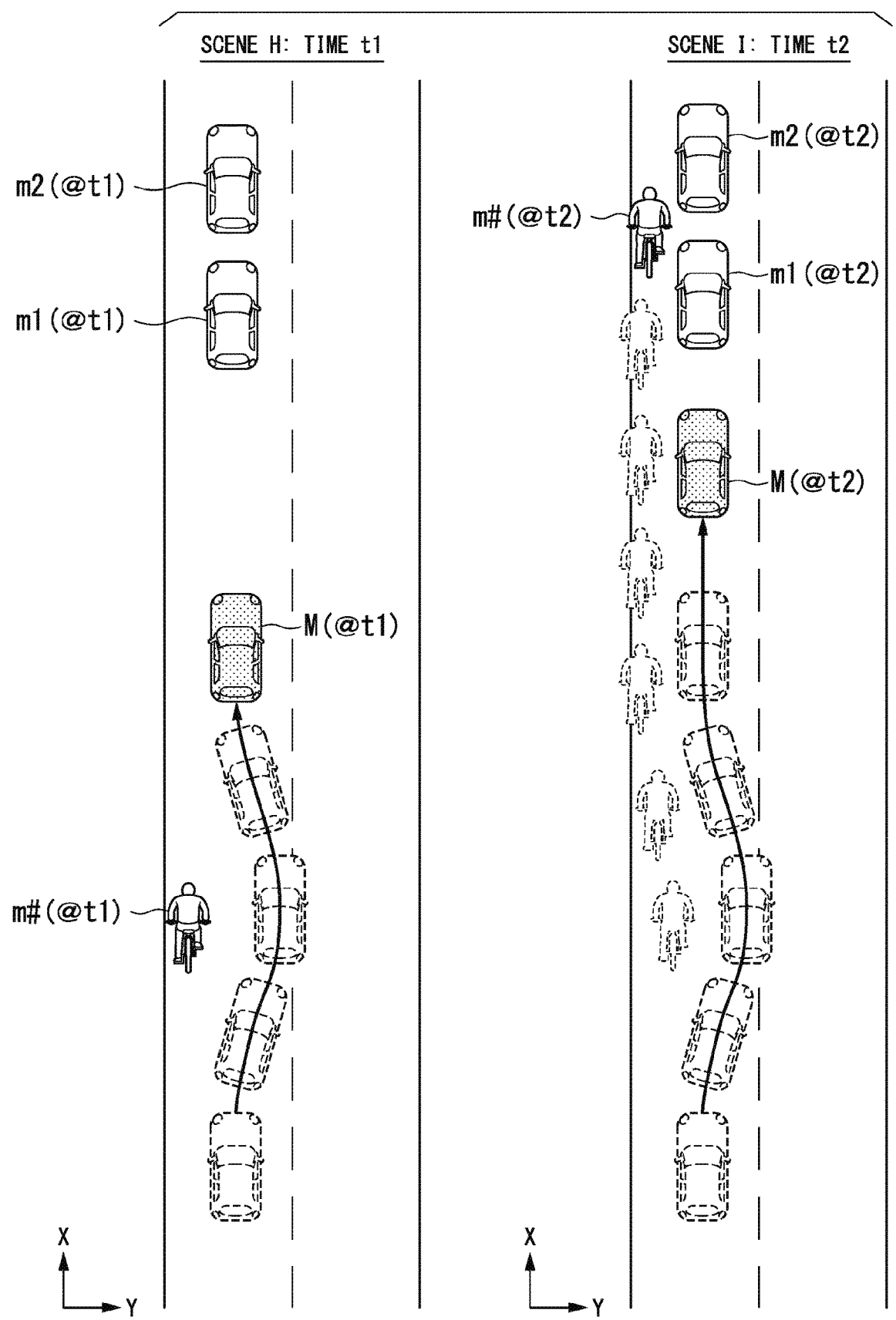
FIG. 7 is a diagram illustrating an example of a scene in which the host vehicle M is overtaken by the overtaken roadside vehicle m #.

FIG. 7 is a diagram illustrating an example of a scene in which the host vehicle M is overtaken by the overtaken roadside vehicle m #. In FIG. 7, m1 and m2 represent other vehicles that have stopped due to signal waiting or congestion. For example, in a scene (H) at time t1, the overtaking predictor 146 predicts that the host vehicle M is not overtaken by the roadside vehicle m #, and the second controller 160 controls a speed and steering of the host vehicle M to cause the host vehicle M to overtake the roadside vehicle m #. In a scene (I) at time t2 after time t1, the host vehicle M is overtaken by the overtaken roadside vehicle m #, unlike a prediction result of the overtaking predictor 146. In such a case, for example, the event determiner 142 of the action plan generator 140 does not change the current event to the overtaking event to curb the overtaking of the roadside vehicle m #. Further, instead of this, the target trajectory generator 144 of the action plan generator 140 may not generate the target trajectory corresponding to the overtaking event or not output the generated target trajectory to the second controller 160 so that overtaking of the roadside vehicle m # may be curbed.

Further, the action plan generator 140 may curb overtaking of the roadside vehicle m # when the host vehicle M being overtaken by the overtaken roadside vehicle m # is repeated a predetermined number of times or more. Further, the action plan generator 140 may curb the overtaking of roadside vehicle m # when the same roadside vehicle m # repeatedly overtakes the host vehicle M. Thus, the process of the flowchart ends.

In the flowchart of FIG. 4 described above, the process of determining whether the inter-vehicle distance $D_{X1}$ between the host vehicle M and the roadside vehicle m # is equal to or greater than the first predetermined distance $D_{XTH1}$ (the process of S100), and the process of decelerating the host vehicle M until the inter-vehicle distance $D_{X1}$ becomes equal to or greater than the first predetermined distance $D_{XTH1}$ (S102) may be omitted.

Further, the overtaking predictor 146 may omit the process of S106 and change the length (size) of the second predetermined distance $D_{XTH2}$ before the process of S104.

For example, when it is predicted that a last vehicle in the congestion recognized as the stopping cause by the recognizer 130 will start and the congestion in front of the host vehicle M will be resolved during a period from the current point in time to the future point in time, the overtaking predictor 146 may shorten the second predetermined distance $D_{XTH2}$ as compared with a case in which it is not predicted that the congestion will be resolved.

Further, for example, the overtaking predictor 146 may lengthen the second predetermined distance $D_{XTH2}$ when the elapsed time after the color of the lights of the traffic signal is switched from blue to red is smaller than the threshold value (when it is shortly after the signal is changed to a red signal), and shorten the second predetermined distance $D_{XTH2}$ when the elapsed time after the color of the lights of the traffic signal is switched from blue to red is equal to or greater than the threshold value (if some time elapses after the signal is changed to the red signal).

Further, for example, when the recognizer 130 recognizes the temporary stop line as the stopping cause, the overtaking predictor 146 may shorten the second predetermined distance $D_{XTH2}$ as compared with when other stopping causes are recognized.

Further, the automated driving control device 100 may perform various determinations by referring to a first predetermined time or a second predetermined time instead of the first predetermined distance $D_{XTH1}$ and the second predetermined distance $D_{XTH2}$. The first predetermined time is, for example, a time that is expected to elapse before the host vehicle M arrives at the roadside vehicle m #, and the second predetermined time is, for example, a time that is expected to elapse before the host vehicle M arrives at a stopping cause. Accordingly, the same process as in a case in which the predetermined distance is used can be performed according to a time left before the host vehicle M arrives at the roadside vehicle m # or the stopping cause. The first predetermined time and the second predetermined time can be calculated more accurately by further considering an acceleration/deceleration of the host vehicle M and, for example, the second predetermined time can be calculated by further considering the deceleration of the host vehicle M with respect to the stopping cause.

Figure 8:
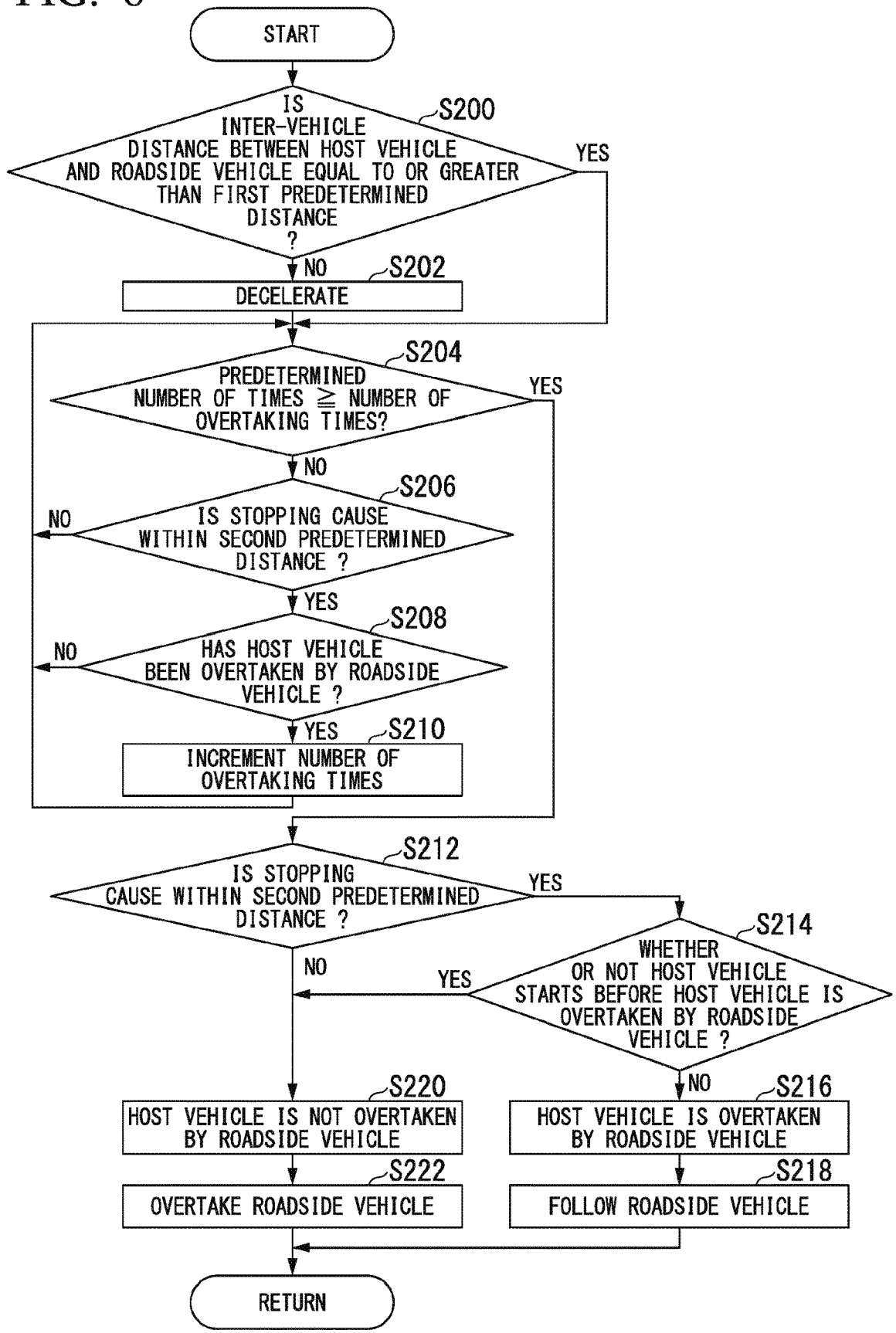
FIG. 8 is a flowchart showing another example of the flow of a series of processes in the automated driving control device 100 according to the first embodiment.

Further, the automated driving control device 100 according to the first embodiment may perform the process according to a flowchart illustrated in FIG. 8 instead of the flowchart illustrated in FIG. 4. FIG. 8 is a flowchart showing another example of the flow of the series of processes in the automated driving control device 100 according to the first embodiment. The process of the flowchart may be repeatedly performed in a predetermined cycle.

First, the event determiner 142 determines whether or not the inter-vehicle distance $D_{X1}$ between the vehicle edge vehicle m # recognized by the recognizer 130 and the host vehicle M is equal to or greater than the first predetermined distance $D_{XTH1}$ (step S200).

When the event determiner 142 determines that the inter-vehicle distance $D_{X1}$ between the roadside vehicle m # and the host vehicle M is smaller than the first predetermined distance $D_{XTH1}$, the event determiner 142 determines the current event to be a deceleration event. In response thereto, the target trajectory generator 144 generates the target trajectory, and the second controller 160 decelerates the host vehicle M until the inter-vehicle distance $D_{X1}$ becomes equal to or greater than the first predetermined distance $D_{XTH1}$ on the basis of the target trajectory (step S202).

On the other hand, when the automated driving control device 100 determines that the inter-vehicle distance $D_{X1}$ between the roadside vehicle m # and the host vehicle M is equal to or greater than the first predetermined distance $D_{XTH1}$, the automated driving control device 100 omits the process of S202 and proceeds to a process of S204.

The event determiner 142 then determines whether the number of times the host vehicle M has been overtaken by the roadside vehicle m # (hereinafter, the number of overtaking times) is equal to or greater than a predetermined number (step S204). The predetermined number of times may be, for example, once or more.

When the automated driving control device 100 determines that the number of overtaking times is equal to or greater than the predetermined number of times, the automated driving control device 100 performs processes of S212 to S222 and ends the process of the flowchart. Because the process of S212 is the same as the process of S104 described above, the process of S214 is the same as the process of S106 described above, the process of S216 is the same as the process of S110 described above, the process of S218 is the same as the process of S112 described above, the process of S220 is the same as the process of S108 described above, and the process of S222 is the same as the process of S114 described above, a description thereof will be omitted herein.

On the other hand, when the event determiner 142 determines that the number of overtaking times is smaller than the predetermined number of times, the event determiner 142 determines whether or not there the stopping cause in the section from the current position of the host vehicle M to the future scheduled arrival position after the second predetermined distance $D_{XTH2}$ (step S206).

When the event determiner 142 determines that there is no stopping cause in the section from the current position of the host vehicle M to the future scheduled arrival position after the second predetermined distance $D_{XTH2}$, the event determiner 142 changes the current event to the overtaking event and returns to the process of S204 in order to cause the host vehicle M to overtake the roadside vehicle m #. Thus, the host vehicle M overtakes the roadside vehicle m #.

On the other hand, when the event determiner 142 determines that the stopping cause is present in the section from the current position of the host vehicle M to the future scheduled arrival position after the second predetermined distance $D_{XTH2}$, the event determiner 142 determines whether or not the host vehicle M has been overtaken by the overtaken roadside vehicle m # on the basis of a recognition result of the recognizer 130 (step S208).

When the event determiner 142 determines that the host vehicle M will not be overtaken by the overtaken roadside vehicle m #, the process returns to S204.

On the other hand, when the overtaking predictor 146 determines that the host vehicle M has been overtaken by the overtaken roadside vehicle m #, the overtaking predictor 146 increments the number of overtaking times (step S210) and returns to the process of S204.

Thus, in the process of the flowchart illustrated in FIG. 8, when a series of events in which the host vehicle M overtakes the roadside vehicle m # and then the host vehicle M is overtaken by the overtaken roadside vehicle m # are repeated a predetermined number of times or more, a determination is made as to whether or not the host vehicle M is caused to follow the roadside vehicle m # instead of overtaking the roadside vehicle m # or to overtake the roadside vehicle m # as in a case in which the series of events are repeated less than the predetermined number of times, on the basis of a prediction result of the overtaking predictor 146.

Figure 9:
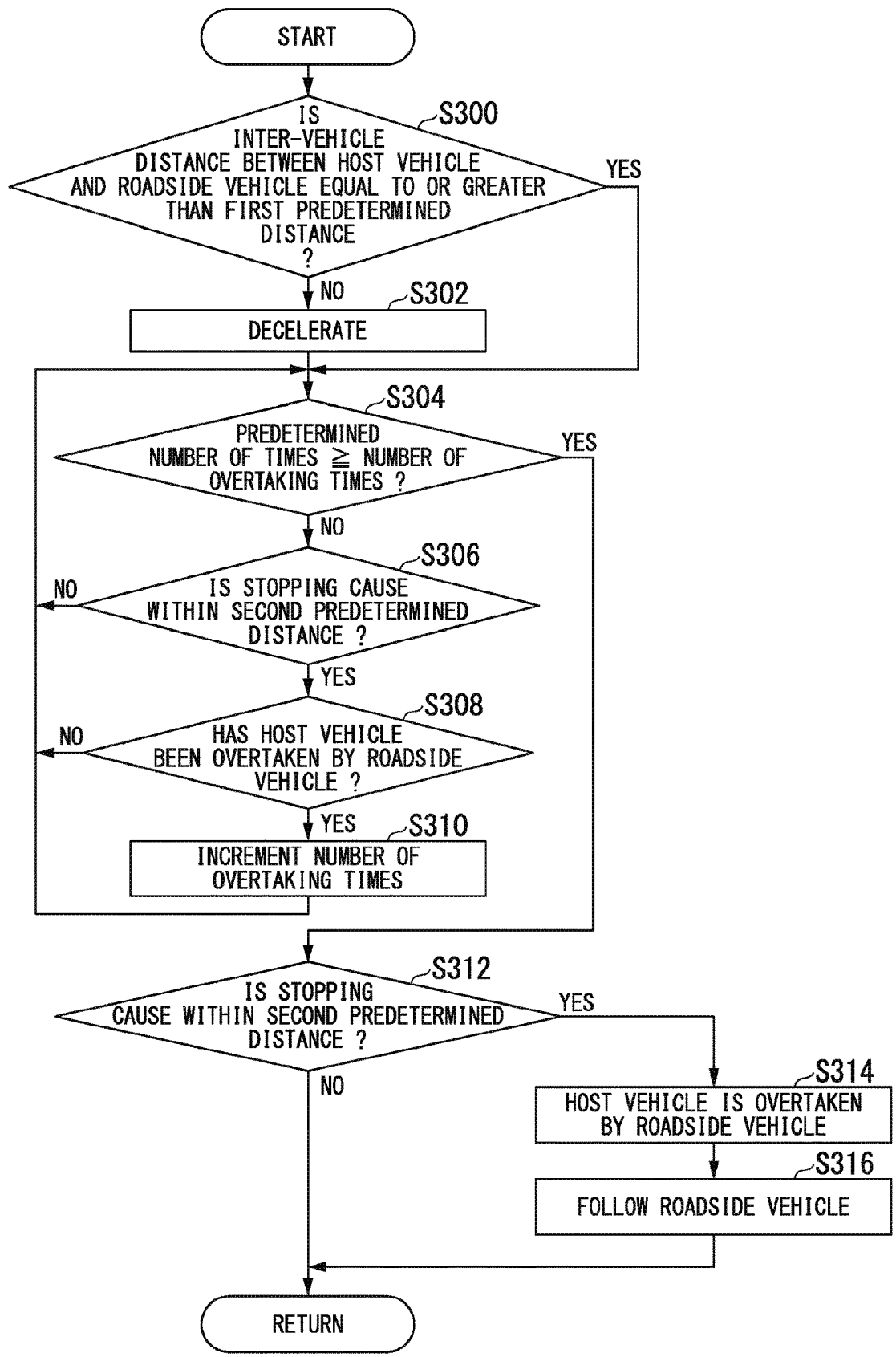
FIG. 9 is a flowchart showing another example of the flow of a series of processes in the automated driving control device 100 according to the first embodiment.

Further, the automated driving control device 100 according to the first embodiment may perform the process according to a flowchart illustrated in FIG. 9 instead of the flowchart illustrated in FIG. 4 or 8. FIG. 9 is a flowchart showing another example of the flow of the series of processes in the automated driving control device 100 according to the first embodiment. The process of this flowchart may be repeatedly performed in a predetermined cycle.

Since processes of S300 to S310 are the same as the processes of S200 to 210 described above, a description thereof will be omitted.

When the number of overtaking times is equal to or greater than the predetermined number, the overtaking predictor 146 determines whether or not there is a stopping cause in the section from the current position of the host vehicle M to the future scheduled arrival position after the second predetermined distance $D_{XTH2}$ (step S312).

When the number of overtaking times is equal to or greater than the predetermined number, there is the stopping cause in the section up to the future scheduled arrival position after the second predetermined distance $D_{XTH2}$, and the host vehicle M overtakes the roadside vehicle m # at the current point in time, the overtaking predictor 146 predicts that the host vehicle M will be overtaken by the overtaken roadside vehicle m # at a future point in time (step S314).

Then, when the overtaking predictor 146 predicts that the host vehicle M will be overtaken by the overtaken roadside vehicle m # at a future point in time in a case in which the host vehicle M overtakes the roadside vehicle m # at the current point in time, the event determiner 142 changes the event determined for the current section to the following traveling event.

In response thereto, the target trajectory generator 144 generates a target trajectory corresponding to the following traveling event. The second controller 160 causes the host vehicle M to follow the roadside vehicle m # on the basis of the generated target trajectory (step S316).

On the other hand, when the number of overtaking times is equal to or greater than the predetermined number and there is no stopping cause in the section up to the future scheduled arrival position after the second predetermined distance $D_{XTH2}$, the automated driving control device 100 ends the process of this flowchart without causing the host vehicle M to overtake the roadside vehicle m # or causing the host vehicle M to be overtaken by the roadside vehicle m #. Accordingly, the host vehicle M continues to travel in a traveling mode corresponding to the current event.

Further, when the automated driving control device 100 recognizes the roadside vehicle m # and the stopping cause in front of the host vehicle M, the automated driving control device 100 may perform, for example, a process of causing the host vehicle M to follow the roadside vehicle m # without causing the host vehicle M to overtake the roadside vehicle m #, instead of or in addition to the process of the flowchart described above. A case in which both the roadside vehicle m # and the stopping cause are recognized in front of the host vehicle M is an example of "when it is predicted that the host vehicle will be overtaken by the overtaken moving body at a future point in time".

Further, in the above description, an example of the condition that the host vehicle M is not caused to overtake the roadside vehicle m # includes a condition that the stopping cause is within a predetermined distance or within a predetermined time (time to arrive), but the present invention is not limited thereto. For example, the automated driving control device 100 may not cause the host vehicle M to overtake the roadside vehicle m # when a stopping cause is detected by a vehicle-mounted sensor such as the camera 10, the radar device 12, or the finder 14. That is, the automated driving control device 100 may determine whether the host vehicle M is caused to overtake the roadside vehicle m # or is not cause to overtake the roadside vehicle m # on the basis of a limited detection distance of the vehicle-mounted sensor without using map information or the like.

According to the first embodiment described above, the vehicle control device includes the recognizer 130 that recognizes an object around the host vehicle M, the second controller 160 that controls a speed and steering of the host vehicle M and causes the host vehicle M to overtake the roadside vehicle m # recognized as an object by the recognizer 130, which is the roadside vehicle m # present in front of the host vehicle M at the side of the road in which the host vehicle M is present, and the overtaking predictor 146 that predicts that the host vehicle M will be overtaken by the overtaken roadside vehicle m # at a future point in time, wherein the second controller 160 does not cause the host vehicle M to overtake the overtaken roadside vehicle m # at a current point in time when the overtaking predictor 146 predicts that the host vehicle M will be overtaken by the roadside vehicle m # at a future point in time, such that automated driving in which an occupant feels more comfortable can be performed.

Second Embodiment

Hereinafter, a second embodiment will be described. The second embodiment differs from the first embodiment described above in that a prediction is performed as to whether or not there is a space in which the roadside vehicle m # can slip through (hereinafter referred to as a slip-through space) between the host vehicle M and the side of the road when the host vehicle M is caused to overtake the roadside vehicle m #, and a prediction is performed as to whether or not the host vehicle M is overtaken by the overtaken roadside vehicle m # according to a prediction result. Hereinafter, differences from the first embodiment will be mainly described, and a description of functions and the like common to those in the first embodiment will be omitted.

The overtaking predictor 146 in the second embodiment, for example, derives a future position in which overtaking of the roadside vehicle m # is completed on the basis of the relative speed between the host vehicle M and the roadside vehicle m # and the relative distance between the host vehicle M and the roadside vehicle m #, predicts that there is the slip-through space when a distance $\Delta D_Y$ between the host vehicle M and a demarcation line that is a partial area at the side of the road at the derived future position is longer than a vehicle width $D_{Ym\_\#}$ of the roadside vehicle m #, and predicts that there is no slip-through space when the distance $\Delta D_Y$ between the host vehicle M and the demarcation line that is a partial area at the side of the road is shorter than the vehicle width $D_{Ym\_\#}$ of the roadside vehicle m #.

Figure 10:
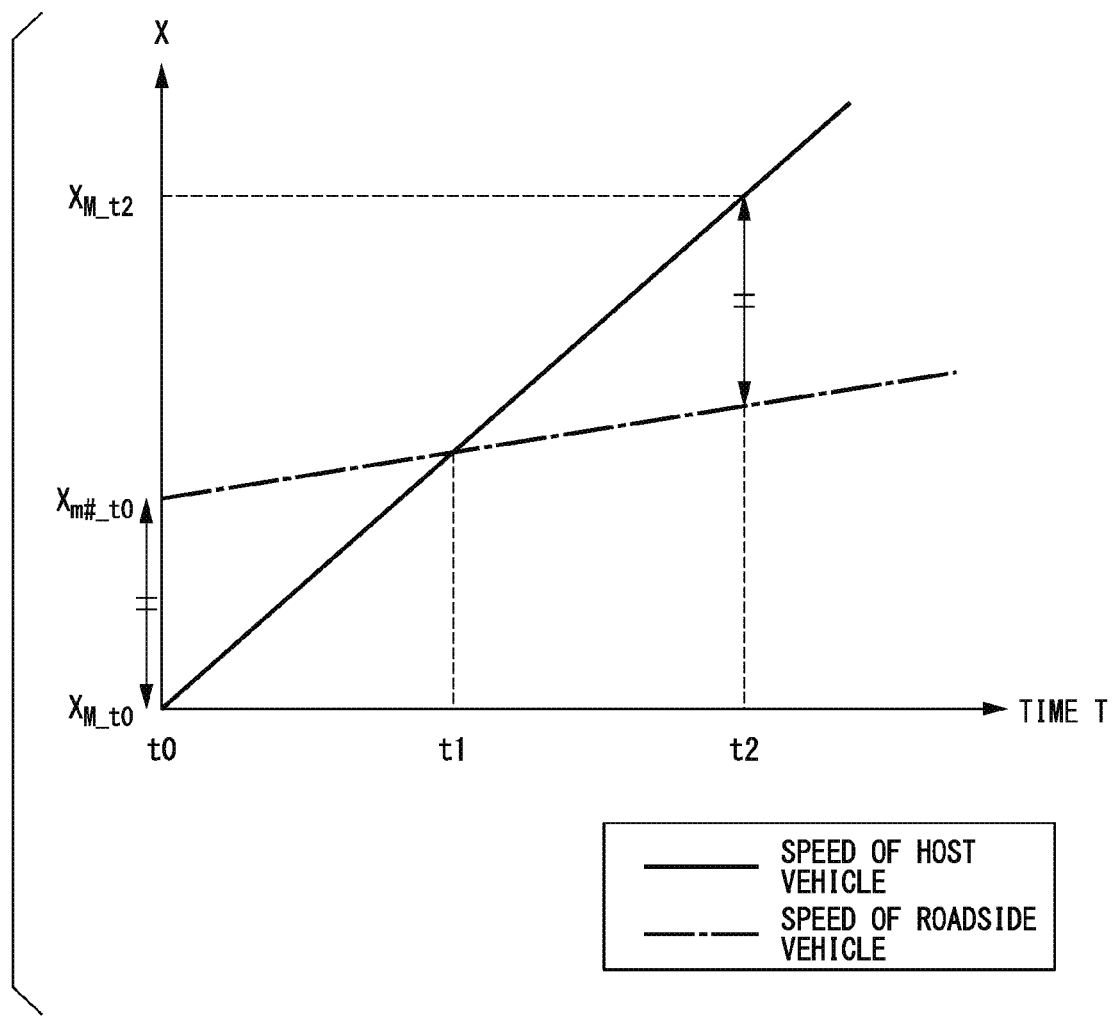
FIG. 10 is a diagram illustrating a method of deriving a future position in which overtaking of the roadside vehicle m # is completed.

FIG. 10 is a diagram illustrating a method of deriving a future position in which overtaking of the roadside vehicle m # is completed. In FIG. 10, a vertical axis X represents a position of each vehicle in a traveling direction of the vehicle, and a horizontal axis T represents time. At a current point in time t0, a position of the host vehicle M in the traveling direction X of the vehicle is $X_{M\_t0}$, and a position of the roadside vehicle m # in the traveling direction X of the vehicle is $X_{m\_\#\_t0}$. In this case, the overtaking predictor 146 assumes that the host vehicle M and the roadside vehicle m # are constantly traveling at a speed at the current point in time t0, and derives the future position in which the host vehicle M overtaking the roadside vehicle m # is completed. For example, a determination may be made that the host vehicle M has overtaken the roadside vehicle m # at a point in time when the host vehicle M arrives at a position in which the inter-vehicle distance between the host vehicle M and the roadside vehicle m # is the same as before the overtaking (that is, the distance $D_{X1}$ equal to or greater than the first predetermined distance $D_{XTH1}$) after the host vehicle M overtakes the roadside vehicle m # and the host vehicle M is present at a center of the lane. At future time t1, because the host vehicle M and the roadside vehicle m # are in the same position (a position in an X direction), the host vehicle M and the roadside vehicle m # are traveling in parallel. Further, at future time t2, after the host vehicle M overtakes the roadside vehicle m #, the inter-vehicle distance between the host vehicle M and the roadside vehicle m # becomes the same distance as before the overtaking. Therefore, the overtaking predictor 146 derives a position $X_{M\_t2}$ of the host vehicle M at time t2 as the future position in which the overtaking will be completed.

Figure 11:
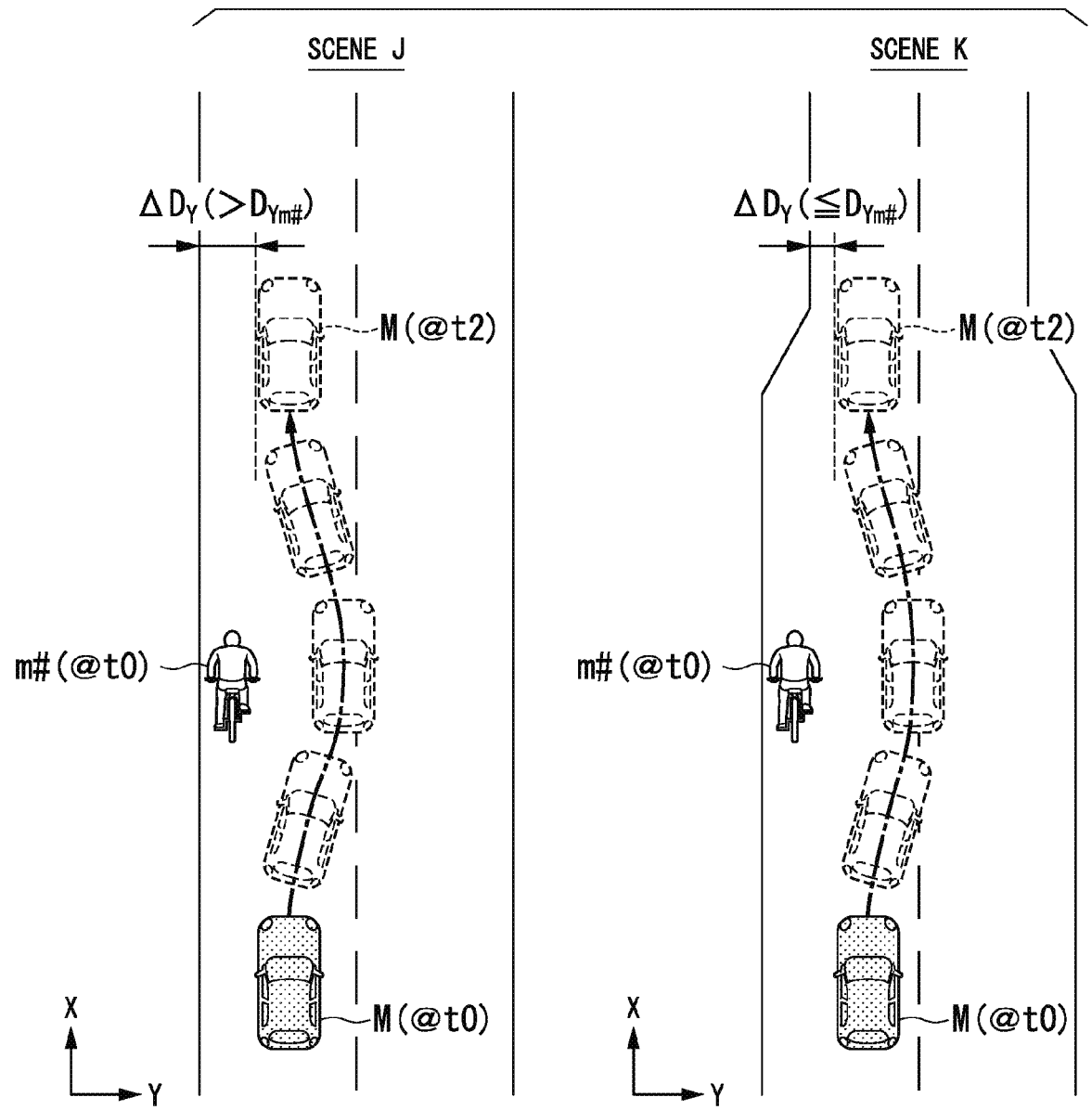
FIG. 11 is a diagram illustrating an example of a scene in which there is a slip-through space and a scene in which there is no slip-through space.

FIG. 11 is a diagram illustrating an example of a scene in which there is a slip-through space and a scene in which there is no slip-through space. For example, in a scene (J), the distance $\Delta D_Y$ between the host vehicle M and the demarcation line is greater than the vehicle width $D_{Ym\_\#}$ of the roadside vehicle m # at a position of the host vehicle M at the future point in time t2 when the overtaking is completed. Therefore, in the scene (J), the overtaking predictor 146 predicts that the host vehicle M will be overtaken by the overtaken roadside vehicle m # at a future point in time because there is a slip-through space. In response thereto, the second controller 160 causes the host vehicle M to follow the roadside vehicle m # instead of causing the host vehicle M to overtake the roadside vehicle m # at the current point in time.

Further, in a scene (K), the distance $\Delta D_Y$ between the host vehicle M and the demarcation line may be smaller than the vehicle width $D_{Ym\_\#}$ of the roadside vehicle m # at the position of the host vehicle M at the future point in time t2 when the overtaking is completed. Therefore, in the scene (K), the overtaking predictor 146 predicts that the host vehicle M will not be overtaken by the overtaken roadside vehicle m # at the future point in time because there is no slip-through space. In response thereto, the second controller 160 causes the host vehicle M to overtake the roadside vehicle m # at the current point in time.

In the above-described example, when the distance $\Delta D_Y$ between the host vehicle M and the demarcation line is greater than the vehicle width $D_{Ym\_\#}$ of the roadside vehicle m #, it is predicted that there is the slip-through space, but the present invention is not limited thereto. When a sum of the distance $\Delta D_Y$ between the host vehicle M and the demarcation line and a distance in a vehicle width direction of the road shoulder or roadside belt on the outer side of the demarcation line is greater than the vehicle width $D_{Ym\_\#}$ of the roadside vehicle m #, it may be predicted that there is the slip-through space.

Further, when there is the slip-through space and an obstacle OB serving as an obstacle to the roadside vehicle m # in traveling is present in the slip-through space, the overtaking predictor 146 may predict that the host vehicle M will not be overtaken by the overtaken roadside vehicle m # at a future point in time.

Figure 12:
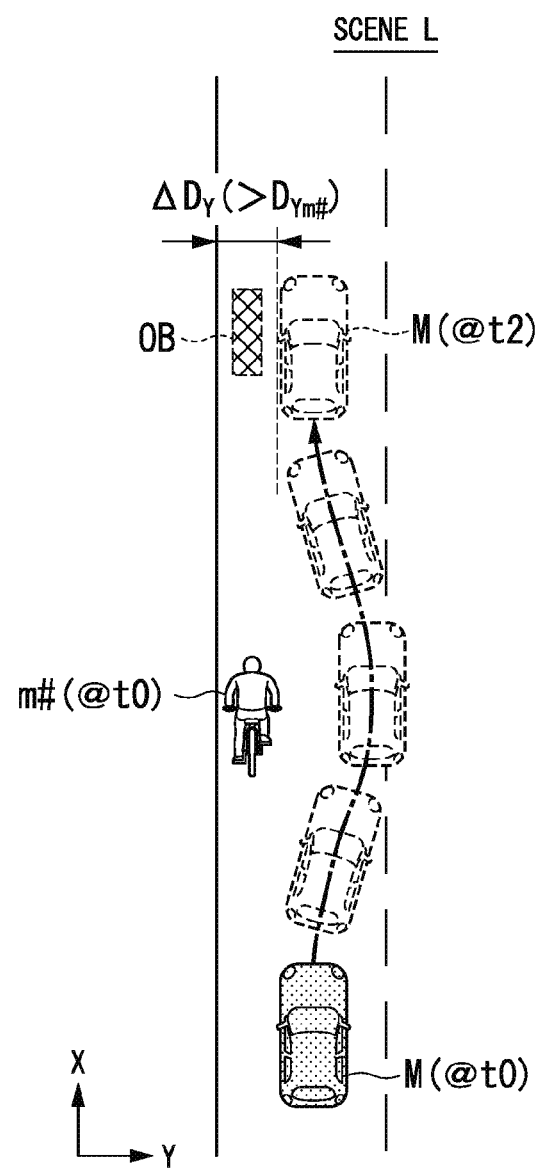
FIG. 12 is a diagram illustrating another example of a scene in which there is a slip-through space.

FIG. 12 is a diagram illustrating another example of a scene in which there is a slip-through space. In a scene (L), the distance $\Delta D_Y$ between the host vehicle M and the demarcation line is greater than the vehicle width $D_{Ym\_\#}$ of the roadside vehicle m # at the position of the host vehicle M at the future point in time t2 when the overtaking is completed. Further, in the scene (L), the obstacle OB is present between the host vehicle M and the demarcation line. In such a case, the overtaking predictor 146 predicts that the host vehicle M will not be overtaken by the overtaken roadside vehicle m # at the future point in time even when there is the slip-through space.

According to the second embodiment described above, when the host vehicle M is caused to overtake the roadside vehicle m #, it is predicted whether or not there is a slip-through space between the host vehicle M and the side of the road, and it is predicted whether or not the host vehicle M will be overtaken by the overtaken roadside vehicle m # according to a prediction result and thus, it is possible to perform automated driving in which an occupant feels comfortable, as in the first embodiment described above, and to overtake the roadside vehicle m # more flexibly.

Third Embodiment

Hereinafter, a third embodiment will be described. The third embodiment differs from the first and second embodiments described above in that, when the roadside vehicle m # is present in a lane demarcated for only a two-wheeled vehicle such as a bicycle (hereinafter referred to as a two-wheeled vehicle-only lane) such as a bicycle-only passage belt or a bicycle traveling instruction belt, the host vehicle M is caused to overtake the roadside vehicle m # regardless of the prediction result of the overtaking predictor 146. The two-wheeled vehicle-only lane is, for example, a lane that is demarcated from a roadway by a demarcation line drawn on a road surface without a boundary with the roadway being physically demarcated by a workpiece such as a fence or a pole at the boundary with the roadway. Hereinafter, differences from the first and second embodiments will be mainly described, and a description of functions and the like common to the first and second embodiments will be omitted.

When the recognizer 130 recognizes the two-wheeled vehicle-only lane, the event determiner 142 in the third embodiment changes the current event to the overtaking event regardless of a prediction result of the overtaking predictor 146. Thereby, because the target trajectory generator 144 generates a target trajectory corresponding to the overtaking event, the host vehicle M overtakes the roadside vehicle m #.

Figure 13:
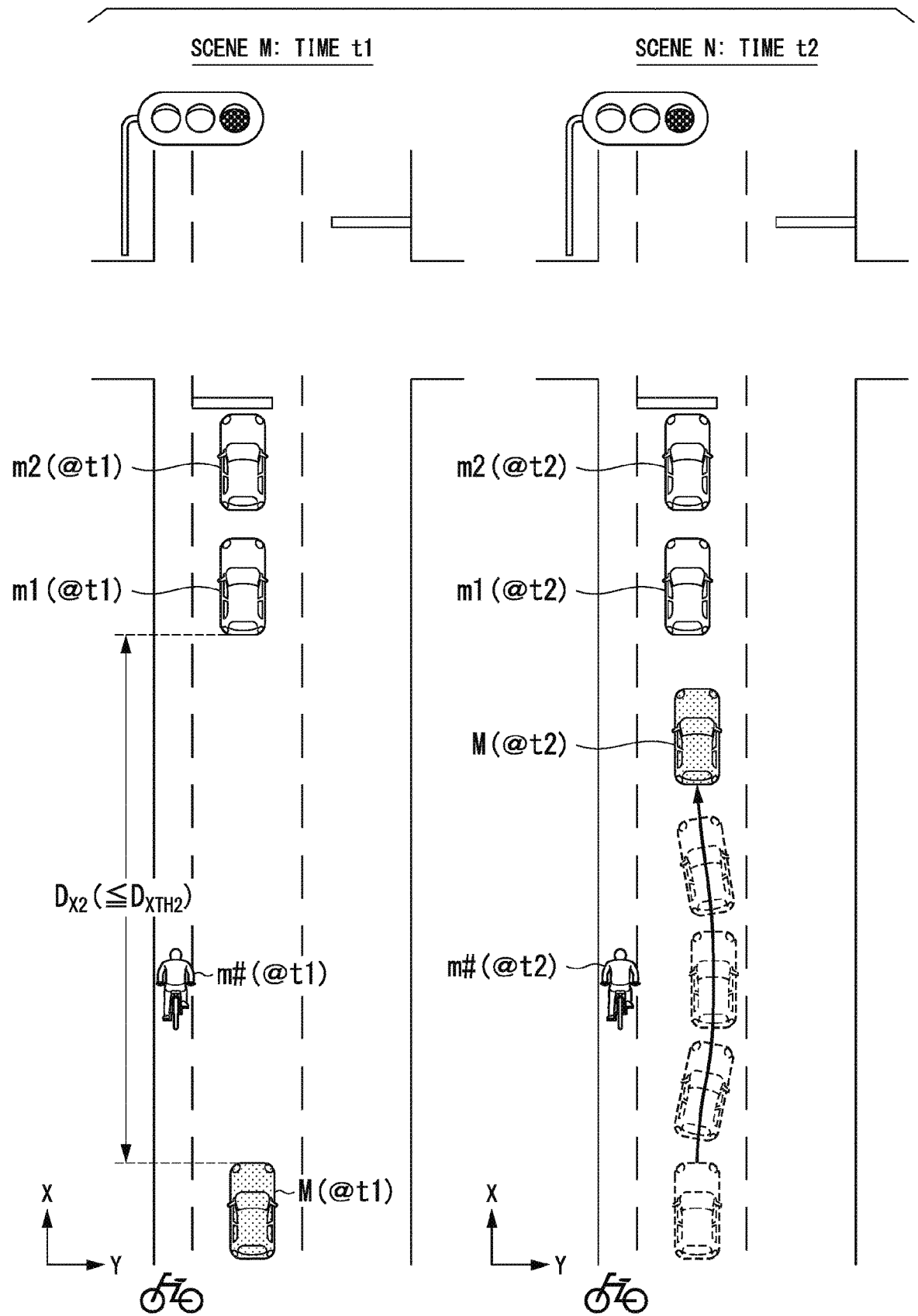
FIG. 13 is a diagram illustrating an example of a scene in which the host vehicle M is caused to overtake the roadside vehicle m # when the host vehicle M is predicted to be overtaken by the overtaken roadside vehicle m #.

FIG. 13 is a diagram illustrating an example of a scene in which the host vehicle M is caused to overtake the roadside vehicle m # when it is predicted that the host vehicle M will be overtaken by the overtaken roadside vehicle m #. In the illustrated example, it is shown that the two-wheeled vehicle-only lane is adjacent to the host lane, and the roadside vehicle m # is traveling on the two-wheeled vehicle-only lane. In a scene (M) at time t1, because the distance $D_{X2}$ from the current position of the host vehicle M to the rear of the other vehicle m1 (a stopping cause) stopped due to signal waiting is equal to or smaller than the second predetermined distance $D_{XTH2}$, the overtaking predictor 146 predicts that the host vehicle M will be overtaken by the roadside vehicle m # at a future point in time until the host vehicle M arrives at the other vehicle m1. On the other hand, because the roadside vehicle m # is traveling on the two-wheeled vehicle-only lane, the event determiner 142 changes the current event to the overtaking event regardless of a prediction result that the host vehicle M will be overtaken by the roadside vehicle m # at a future point in time until the host vehicle M arrives at the other vehicle m1. In response thereto, the second controller 160 causes the host vehicle M to overtake, on the host lane, the roadside vehicle m # on the two-wheeled vehicle-only lane, as shown in a scene (N) at time t2.

According to the third embodiment described above, when the roadside vehicle m # is present in the two-wheeled vehicle-only lane, the host vehicle M is caused to overtake the roadside vehicle m # regardless of the prediction result of the overtaking predictor 146 and thus, it is possible to perform automated driving in which an occupant feels comfortable and to perform more natural automated driving. For example, when a two-wheeled vehicle-only lane is provided on the road, the occupant of the host vehicle M assumes that the roadside vehicle m # will pass through the two-wheeled vehicle-only lane and thus, even when the roadside vehicle m # overtakes the host vehicle M, an occupant tends to be less uncomfortable. Thus, the host vehicle M is allowed to be overtaken by the overtaken roadside vehicle m # in a situation in which the roadside vehicle m # is traveling in the two-wheeled vehicle-only lane, making it possible to perform more natural automated driving.

[Hardware Configuration]

Figure 14:
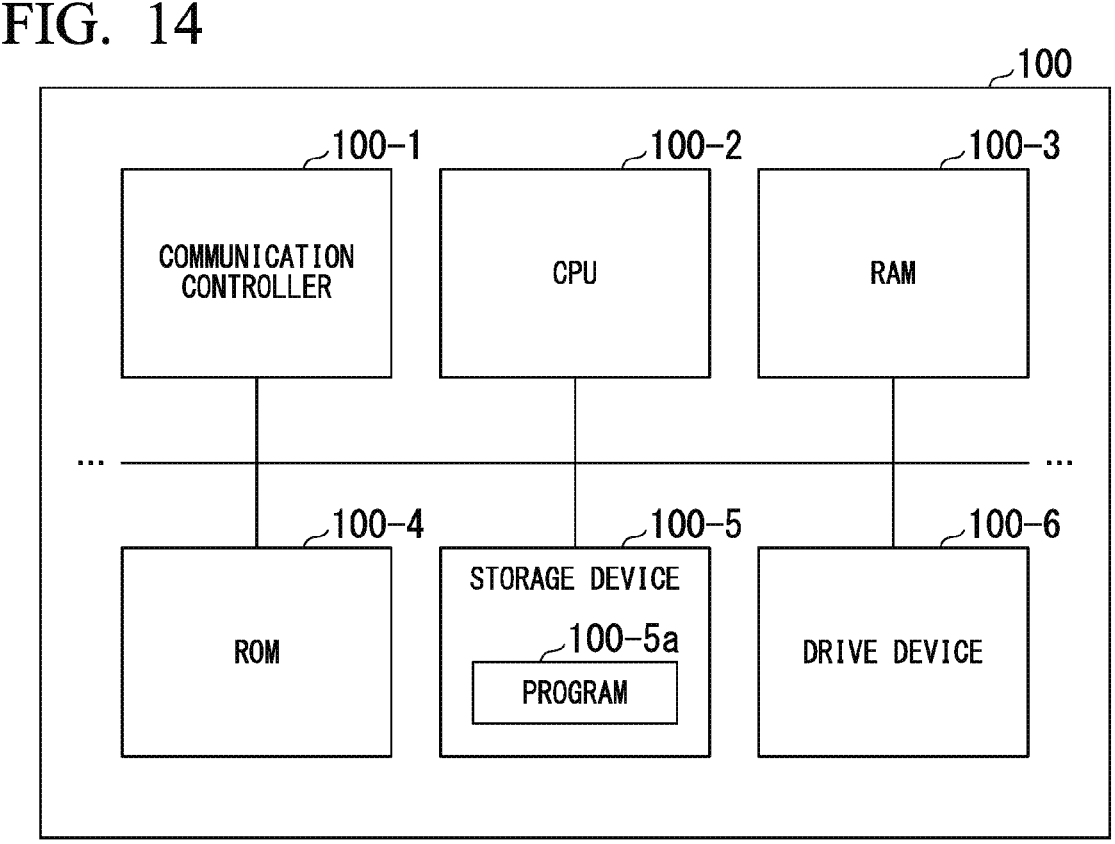
FIG. 14 is a diagram illustrating an example of a hardware configuration of the automated driving control device 100 of the embodiment.

FIG. 14 is a diagram illustrating an example of a hardware configuration of the automated driving control device 100 according to the embodiment. As illustrated in FIG. 14, the automated driving control device 100 has a configuration in which a communication controller 100-1, a CPU 100-2, a RAM 100-3 that is used as a working memory, a ROM 100-4 that stores a boot program or the like, a storage device 100-5 such as a flash memory or an HDD, a drive device 100-6, and the like are connected to each other by an internal bus or a dedicated communication line. The communication controller 100-1 communicates with components other than the automated driving control device 100. A program 100-5a to be executed by the CPU 100-2 is stored in the storage device 100-5. This program is developed in the RAM 100-3 by a direct memory access (DMA) controller (not illustrated) or the like and executed by the CPU 100-2. Thereby, one or both of the first controller 120 and the second controller 160 are realized.

The embodiments described above can be represented as follows.

A vehicle control device includes a storage that stores a program, and a processor, wherein the processor is configured to recognize an object around a host vehicle;

control a speed and steering of the host vehicle and cause the host vehicle to overtake a moving body recognized as an object in a predetermined case, the moving body being a moving body present at a side of a road on which the host vehicle is present;

predict that the host vehicle will be overtaken by the overtaken moving body at a future point in time when the moving body is recognized; and not cause the host vehicle to overtake the moving body when it is predicted that the host vehicle will be overtaken by the overtaken moving body at a future point in time, by executing the program.

While forms for carrying out the present invention have been described using the embodiments, the present invention is not limited to these embodiments at all, and various modifications and substitutions can be made without departing from the gist of the present invention.

DESCRIPTION OF REFERENCE NUMERALS

1: Vehicle system
10: Camera
12: Radar device
14: Finder
16: Object recognition device
20: Communication device
30: HMI
40: Vehicle sensor
50: Navigation device
60: MPU
80: Driving Operator
100: Automated driving control device
120: First controller
130: Recognizer
140: Action plan generator
142: Event determiner
144: Target trajectory generator
146: Overtaking predictor
160: Second controller
162: Acquirer
164: Speed controller
166: Steering controller
200: Travel driving force output device
210: Brake device
220: Steering device

What is claimed is:

1. A vehicle control device comprising a processor, the processor configured to:

recognize an object around a host vehicle;

recognize a two-wheeled vehicle-only lane from a road on which the host vehicle is present; and control a speed and steering of the host vehicle and enable the host vehicle to overtake a moving body recognized as the object in a predetermined case, the moving body being a moving body present at a side of the road;

wherein the processor is further configured to cause the host vehicle to overtake the moving body when the two-wheeled vehicle-only lane and the moving body on the two-wheeled vehicle-only lane are recognized, wherein the processor is further configured to determine whether or not to cause the host vehicle to overtake the moving body based on the predetermined case when the two-wheeled vehicle-only lane is not recognized and the moving body on a host lane is recognized, the host lane being a lane of the road on which the vehicle is present, and wherein the processor further causes the host vehicle to overtake the moving body when a prediction is made that the host vehicle will be not overtaken by the overtaken moving body at a predetermined future point in time.

2. The vehicle control device according to claim 1, wherein the processor is further configured to predict that the host vehicle will stop at the predetermined future point in time when the host vehicle will arrive at a future position after a predetermined distance from a current position, and is further configured to predict that the host vehicle will be overtaken by the overtaken moving body when a prediction that the host vehicle will stop at the predetermined future point in time.

3. The vehicle control device according to claim 2, wherein the processor is further configured to predict that the host vehicle will start before the moving body overtakes the host vehicle when a prediction that the host vehicle will stop at the predetermined future point in time, and predict that the host vehicle will not be overtaken by the overtaken moving body at the predetermined future point in time when a prediction that the host vehicle will start before the moving body overtakes the host vehicle.

4. The vehicle control device according to claim 1, wherein the processor is further configured to cause the host vehicle to overtake the moving body when a prediction that the host vehicle will not be overtaken by the overtaken moving body at the predetermined future point in time.

5. The vehicle control device according to claim 1, wherein the processor is also configured to not cause the host vehicle to overtake the moving body when a color of lights of a traffic signal in front of the host vehicle is first color indicating vehicle passage prohibition.

6. The vehicle control device according to claim 5,
wherein the processor is further configured to predict that the color of the lights of the traffic signal will change from the first color to a second color indicating vehicle passage permission within a predetermined period from the current point in time to the predetermined future point in time when the color of the lights of the traffic signal in front of the host vehicle is the first color at the current point in time, and
the processor is further configured to cause the host vehicle to overtake the moving body when a prediction that the color of the lights of the traffic signal will change from the first color to the second color within the predetermined period.

7. The vehicle control device according to claim 1, wherein the processor is further configured to predict that the host vehicle will be overtaken by the overtaken moving body at the predetermined future point in time when there is a space beside the host vehicle in which the host vehicle will be overtaken by the overtaken moving body at the predetermined future point in time.

8. The vehicle control device according to claim 1, wherein the processor is further configured to not cause the host vehicle to overtake the moving body from the next time when the host vehicle is overtaken by the overtaken moving body after the host vehicle is caused to overtake the moving body.

9. The vehicle control device according to claim 1, wherein the processor is further configured to not cause the host vehicle to overtake the moving body from the next time when the host vehicle being overtaken by the overtaken moving body after the processor causes the host vehicle to overtake the moving body is repeated a predetermined number of times or more.

10. The vehicle control device according to claim 1, wherein the processor is further configured to cause the host vehicle to travel while at least keeping an inter-vehicle distance between the host vehicle and the moving body constant instead of causing the host vehicle to overtake the moving body when a prediction that the host vehicle will be overtaken by the overtaken moving body at the predetermined future point in time.

11. The vehicle control device according to claim 1,
the processor is further configured to cause the host vehicle to overtake the moving body when the processor recognizes the two-wheeled vehicle-only lane even when a prediction that the host vehicle will be overtaken by the overtaken moving body at the predetermined future point in time.

12. A vehicle control method comprising:
recognizing, by a vehicle-mounted computer, an object around a host vehicle;
recognizing, by a vehicle-mounted computer, a two-wheeled vehicle-only lane from a road on which the host vehicle is present;
controlling, by the vehicle-mounted computer, a speed and steering of the host vehicle and causing the host vehicle to overtake a moving body recognized as an object in a predetermined case, the moving body being a moving body present at a side of the road;
causing, by a vehicle-mounted computer, the host vehicle to overtake the moving body when the two-wheeled vehicle-only lane and the moving body on the two-wheeled vehicle-only lane are recognized;
determining, by a vehicle-mounted computer, whether or not to cause the host vehicle to overtake the moving body based on the predetermined case when the two-wheeled vehicle-only lane is not recognized and the moving body on a host lane is recognized, the host lane being a lane of the road on which the vehicle is present; and
further causing, by the vehicle-mounted computer, the host vehicle to overtake the moving body when a prediction is made that the host vehicle will be not overtaken by the overtaken moving body at a predetermined future point in time.

13. A computer-readable non-transitory storage medium storing a program for causing a vehicle-mounted computer to execute the processes of:
recognizing an object around a host vehicle;
recognizing a two-wheeled vehicle-only lane from a road on which the host vehicle is present;
controlling a speed and steering of the host vehicle and causing the host vehicle to overtake a moving body recognized as an object in a predetermined case, the moving body being a moving body present at a side of the road;
causing the host vehicle to overtake the moving body when the two-wheeled vehicle-only lane and the moving body on the two-wheeled vehicle-only lane are recognized;
determining whether or not to cause the host vehicle to overtake the moving body based on the predetermined case when the two-wheeled vehicle-only lane is not recognized and the moving body on a host lane is recognized, the host lane being a lane of the road on which the vehicle is present;
further causing the host vehicle to overtake the moving body when a prediction is made that the host vehicle will be not overtaken by the overtaken moving body at a predetermined future point in time.

* * * * *